United States Patent
Kim et al.

(10) Patent No.: US 10,817,985 B2
(45) Date of Patent: *Oct. 27, 2020

(54) APPARATUSES AND METHODS FOR PERFORMING ARTIFICIAL INTELLIGENCE ENCODING AND ARTIFICIAL INTELLIGENCE DECODING ON IMAGE

(71) Applicant: SAMSUNG ELECTRONICS CO., LTD., Suwon-si (KR)

(72) Inventors: Jaehwan Kim, Suwon-si (KR); Jongseok Lee, Suwon-si (KR); Sunyoung Jeon, Suwon-si (KR); Kwangpyo Choi, Suwon-si (KR); Minseok Choi, Suwon-si (KR); Quockhanh Dinh, Suwon-si (KR); Youngo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,812

(22) Filed: Oct. 18, 2019

(65) Prior Publication Data
US 2020/0126186 A1    Apr. 23, 2020

(30) Foreign Application Priority Data

| Oct. 19, 2018 | (KR) | ................. 10-2018-0125406 |
| Apr. 8, 2019 | (KR) | ................. 10-2019-0041108 |
| Jun. 4, 2019 | (KR) | ................. 10-2019-0066057 |

(51) Int. Cl.
*G06T 3/40*    (2006.01)
*G06T 9/00*    (2006.01)
(Continued)

(52) U.S. Cl.
CPC .......... *G06T 3/4046* (2013.01); *G06N 3/084* (2013.01); *G06N 20/10* (2019.01); *G06T 9/002* (2013.01);
(Continued)

(58) Field of Classification Search
CPC ......... G03T 3/4046; G03T 2207/20084; G03T 2207/20081; G03T 9/002; G03T 7/0002;
(Continued)

(56) References Cited

U.S. PATENT DOCUMENTS

| 7,308,031 B2 | 12/2007 | Yamaguchi et al. |
| 7,400,588 B2 | 7/2008 | Izzat et al. |

(Continued)

FOREIGN PATENT DOCUMENTS

| JP | 2008-527810 A | 7/2008 |
| JP | 2012-191250 A | 10/2012 |

(Continued)

OTHER PUBLICATIONS

Jiang, Feng, et al. "An end-to-end compression framework based on convolutional neural networks." IEEE Transactions on Circuits and Systems for Video Technology 28.10 (2017): 3007-3018. (Year: 2017).*

(Continued)

*Primary Examiner* — Geoffrey E Summers
(74) *Attorney, Agent, or Firm* — Sughrue Mion, PLLC

(57) ABSTRACT

An artificial intelligence (AI) decoding apparatus includes a memory storing one or more instructions, and a processor configured to execute the stored one or more instructions, to obtain image data corresponding to a first image that is encoded, obtain a second image corresponding to the first image by decoding the obtained image data, determine whether to perform AI up-scaling of the obtained second image, based on the AI up-scaling of the obtained second (Continued)

image being determined to be performed, obtain a third image by performing the AI up-scaling of the obtained second image through an up-scaling deep neural network (DNN), and output the obtained third image, and based on the AI up-scaling of the obtained second image being determined to be not performed, output the obtained second image.

16 Claims, 22 Drawing Sheets

(51) Int. Cl.
    *G06N 3/08*     (2006.01)
    *H04N 19/85*     (2014.01)
    *G06N 20/10*     (2019.01)

(52) U.S. Cl.
    CPC .... *H04N 19/85* (2014.11); *G06T 2207/20081* (2013.01); *G06T 2207/20084* (2013.01)

(58) Field of Classification Search
    CPC .......... G06N 3/02; G06N 3/084; G06N 20/00; G06N 20/10; G06N 3/04; G06N 3/06; G06N 3/08; G06N 3/0481; G06N 3/0454; G06T 3/4046; G06T 2207/20084; G06T 2207/20081; G06T 9/002; G06T 7/0002; G06T 3/4053; H04N 19/85; H04N 19/117; H04N 19/132; H04N 19/172; H04N 19/46; H04N 19/80
    USPC ....... 382/298, 299, 300, 156, 157, 158, 232, 382/233
See application file for complete search history.

(56) References Cited

U.S. PATENT DOCUMENTS

| | | | |
|---|---|---|---|
| 8,184,164 B2 | 5/2012 | Yang et al. | |
| 9,251,572 B2 | 2/2016 | Shu et al. | |
| 9,679,213 B2 | 6/2017 | Yang et al. | |
| 10,148,723 B2 | 12/2018 | Falvo | |
| 10,218,971 B2 | 2/2019 | Dong et al. | |
| 2007/0189392 A1 | 8/2007 | Tourapis et al. | |
| 2011/0026819 A1* | 2/2011 | Lee ...................... | H04N 19/176 382/166 |
| 2012/0026288 A1* | 2/2012 | Tourapis .............. | H04N 19/423 348/43 |
| 2012/0230604 A1 | 9/2012 | Yamajo et al. | |
| 2014/0177706 A1 | 6/2014 | Fernandes et al. | |
| 2015/0042878 A1* | 2/2015 | Jeon ...................... | H04N 19/59 348/441 |
| 2015/0256828 A1 | 9/2015 | Dong et al. | |
| 2017/0208345 A1 | 7/2017 | Jeong et al. | |
| 2017/0287109 A1 | 10/2017 | Tasfi | |
| 2017/0345130 A1* | 11/2017 | Wang .................... | G06T 3/4046 |
| 2017/0347061 A1 | 11/2017 | Wang et al. | |
| 2018/0107925 A1 | 4/2018 | Choi et al. | |
| 2018/0131953 A1* | 5/2018 | Wang .................... | G06T 3/4053 |
| 2018/0139458 A1* | 5/2018 | Wang .................... | H04N 19/33 |
| 2018/0174275 A1 | 6/2018 | Bourdev et al. | |
| 2018/0176570 A1 | 6/2018 | Rippel et al. | |
| 2018/0249158 A1 | 8/2018 | Huang et al. | |
| 2018/0288440 A1 | 10/2018 | Chao | |
| 2018/0293706 A1 | 10/2018 | Viswanathan et al. | |
| 2018/0302456 A1 | 10/2018 | Katsavounidis et al. | |
| 2019/0013822 A1 | 1/2019 | Marpe et al. | |
| 2019/0075301 A1* | 3/2019 | Chou .................... | G06N 3/08 |
| 2019/0230354 A1 | 7/2019 | Kim | |

FOREIGN PATENT DOCUMENTS

| | | |
|---|---|---|
| KR | 10-0224801 B1 | 10/1999 |
| KR | 10-0286443 B1 | 4/2001 |
| KR | 10-2014-0145560 A | 12/2014 |
| KR | 10-2016-0036662 A | 4/2016 |
| KR | 10-2016-0080929 A | 7/2016 |
| KR | 10-2017-0059040 A | 5/2017 |
| KR | 10-2017-0100045 A | 9/2017 |
| KR | 10-2018-0001428 A | 1/2018 |
| KR | 10-2018-0043154 A | 4/2018 |
| KR | 10-2018-0052651 A | 5/2018 |
| KR | 10-1885855 B1 | 8/2018 |
| KR | 10-2018-0100976 A | 9/2018 |
| KR | 10-2018-0108288 A | 10/2018 |
| WO | 2017/036370 A1 | 3/2017 |
| WO | 2018/143992 A1 | 8/2018 |
| WO | WO 2019/220095 A1 * | 11/2019 |

OTHER PUBLICATIONS

Aklson, Alex. "Shallow Versus Deep Neural Networks." Introduction to Deep Learning & Neural Networks with Keras, Coursera. https://www.coursera.org/lecture/introduction-to-deep-learning-with-keras/shallow-versus-deep-neural-networks-3pKHn. Accessed Nov. 26, 2019. (Year: 2019).*

Gorodilov, Artem, Dmitriy Gavrilov, and Dmitriy Schelkunov. "Neural Networks for Image and Video Compression." 2018 International Conference on Artificial Intelligence Applications and Innovations (IC-AIAI). IEEE. (Year: 2018).*

Zhang, Xiangjun, and Xiaolin Wu. "Can lower resolution be better?." Data Compression Conference (dcc 2008). IEEE, 2008. (Year: 2008).*

Kim, Jaehwan, et al. "Dynamic frame resizing with convolutional neural network for efficient video compression." Applications of Digital Image Processing XL. vol. 10396. International Society for Optics and Photonics, 2017. (Year: 2017).*

Afonso, Mariana, Fan Zhang, and David R. Bull. "Spatial resolution adaptation framework for video compression." Applications of Digital Image Processing XLI. vol. 10752. International Society for Optics and Photonics, 2018. (Year: 2018).*

Courbariaux, M., et al., "BinaryConnect: Training Deep Neural Networks with binary weights during propagations", Apr. 18, 2016, arXiv:1511.00363v3 [cs.LG], 9 pages total.

Rastegari, M., et al., "XNOR-Net: ImageNet Classification Using Binary Convolutional Neural Networks", Sep. 17, 2016, 27 pages total.

Communication (PCT/ISA/220, PCT/ISA/210 & PCT/ISA/237) dated Dec. 4, 2019 by the International Searching Authority in counterpart International Patent Application No. PCT/KR2019/010645.

Communication (PCT/ISA/220, PCT/ISA/210 & PCT/ISA/237) dated Jan. 23, 2020 by the International Searching Authority in counterpart International Patent Application No. PCT/KR2019/012836.

Communication (PCT/ISA/220, PCT/ISA/210 & PCT/ISA/237) dated Jan. 29, 2020 by the International Searching Authority in counterpart International Patent Application No. PCT/KR2019/013595.

Communication (PCT/ISA/220, PCT/ISA/210 & PCT/ISA/237) dated Jan. 30, 2020 by the International Searching Authority in counterpart International Patent Application No. PCT/KR2019/013421.

Communication (PCT/ISA/220, PCT/ISA/210 & PCT/ISA/237) dated Feb. 5, 2020 by the International Searching Authority in counterpart International Patent Application No. PCT/KR2019/013483.

Communication (PCT/ISA/220, PCT/ISA/210 & PCT/ISA/237) dated Feb. 21, 2020 by the International Searching Authority in counterpart International Patent Application No. PCT/KR2019/013733.

Jeong, Woojin et al., "Efficient Super-Resolution Method for Single Image based on Deep Neural Networks", Journal of the Institute of Electronics and Information Engineers, vol. 55, No. 6, pp. 779- 786, Jun. 2018. (10 pages total).

Sergey Ioffe et al., "Batch Normalization: Accelerating Deep Network Training by Reducing Internal Covariate Shift", Proceedings

(56) References Cited

OTHER PUBLICATIONS of the 32nd International Conference on Machine Learning 2015, vol. 37, pp. 448-456, 2015. (11 pages total).

Seungbin Lee et al., "Performance Analysis of Convolution Neural Network and Generative Adversarial Network for Super Resolution", Journal of the Korean Institute of Information Scientists and Engineers, Jun. 2017, pp. 931-933. (6 pages total).

International Search Report and Written Opinion (PCT/ISA/210 and PCT/ISA/237), dated Jan. 7, 2020 by International Searching Authority in International Application No. PCT/KR2019/012510.

Sehwan Ki et al. "A Study on the Convolution Neural Network based on Blind High Dynamic Range Image Quality Assessment" the Journal of Korean Institute of Communications and Information Sciences, Jan. 2018, (5 pages total)

Patrick Le Callet et al. "A Convolutional Neural Network Approach for Objective Video Quality Assessment" IEEE Transactions on Neural Networks, vol. 17, No. 5, Sep. 2006, (14 pages).

Michalis Giannopoulos et al. "Convolutional Neural Networks for Video Quality Assessment" Sep. 26, 2018, [retrieved from https://arxiv.org/abs/1809.10117v1] (14 pages total).

International Search Report and Written Opinion (PCT/ISA/210 and PCT/ISA/237), dated Aug. 6, 2019 by International Searching Authority in International Application No. PCT/KR2019/004171.

International Search Report and Written Opinion (PCT/ISA/210 and PCT/ISA/237), dated Jan. 22, 2020 by International Searching Authority in International Application No. PCT/KR2019/013344.

\* cited by examiner

FIG. 5

| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

# APPARATUSES AND METHODS FOR PERFORMING ARTIFICIAL INTELLIGENCE ENCODING AND ARTIFICIAL INTELLIGENCE DECODING ON IMAGE

CROSS-REFERENCE TO RELATED APPLICATIONS

This application is based on and claims priority under 35 U.S.C. § 119 to Korean Patent Application No. 10-2018-0125406, filed on Oct. 19, 2018, Korean Patent Application No. 10-2019-0041108, filed on Apr. 8, 2019, and Korean Patent Application No. 10-2019-0066057, filed on Jun. 4, 2019, in the Korean Intellectual Property Office, the disclosures of which are incorporated by reference herein in their entireties.

BACKGROUND

1. Field

The disclosure relates to encoding and decoding an image. More particularly, the disclosure relates to apparatuses and methods for encoding and decoding an image based on artificial intelligence (AI).

2. Description of Related Art

An image is stored in a recording medium or transmitted via a communication channel in a form of a bitstream after being encoded via a codec following a data compression standard, such as the Moving Picture Experts Group (MPEG) standard.

With the development and supply of hardware capable of reproducing and storing high resolution and high quality images, the need for a codec capable of effectively encoding and decoding such high resolution and high quality images has increased.

SUMMARY

According to embodiments, an artificial intelligence (AI) decoding apparatus includes a memory storing one or more instructions, and a processor configured to execute the stored one or more instructions, to obtain image data corresponding to a first image that is encoded, obtain a second image corresponding to the first image by decoding the obtained image data, determine whether to perform AI up-scaling of the obtained second image, based on the AI up-scaling of the obtained second image being determined to be performed, obtain a third image by performing the AI up-scaling of the obtained second image through an up-scaling deep neural network (DNN), and output the obtained third image, and based on the AI up-scaling of the obtained second image being determined to be not performed, output the obtained second image.

The processor may be further configured to execute the stored one or more instructions to obtain AI data related to AI down-scaling of an original image into the first image through a down-scaling DNN, and determine whether to perform the AI up-scaling of the obtained second image, based on the obtained AI data.

The processor may be further configured to execute the stored one or more instructions to verify whether the first image is obtained by performing the AI down-scaling of the original image, based on the obtained AI data, and based on the first image being verified to be obtained by performing the AI down-scaling of the original image, determine to perform the AI up-scaling of the obtained second image.

The processor may be further configured to execute the stored one or more instructions to verify whether the first image is obtained by performing the AI down-scaling of the original image, based on the obtained AI data, and whether the up-scaling DNN is available, and based on the first image being verified to be obtained by performing the AI down-scaling of the original image, and based on the up-scaling DNN being verified to be available, determine to perform the AI up-scaling of the obtained second image.

The processor may be further configured to execute the stored one or more instructions to determine whether the up-scaling DNN is stored in the AI decoding apparatus, and whether DNN setting information for operating the up-scaling DNN is stored in the AI decoding apparatus, and based on the up-scaling DNN being determined to be not stored in the AI decoding apparatus or the DNN setting information being determined to be not stored in the AI decoding apparatus, determine that the up-scaling DNN is not available.

The processor may be further configured to execute the stored one or more instructions to, based on the first image being verified to be obtained by performing the AI down-scaling of the original image, and based on the up-scaling DNN being verified to be not available, output the obtained second image. The output second image may be up-scaled by a display apparatus.

The processor may be further configured to execute the stored one or more instructions to, based on the first image being verified to be obtained by performing the AI down-scaling of the original image, and based on the up-scaling DNN being verified to be not available, determine to perform legacy up-scaling of the obtained second image.

The processor may be further configured to execute the stored one or more instructions to obtain DNN setting information for performing the AI up-scaling of the obtained second image among a plurality of DNN setting information, based on the obtained AI data, and obtain the third image by performing the AI up-scaling of the obtained second image through the up-scaling DNN operating based on the obtained DNN setting information.

The up-scaling DNN may be trained based on quality loss information corresponding to a result of comparing a training image that is output from the up-scaling DNN and an original training image.

The processor may be further configured to execute the stored one or more instructions to obtain the third image by inputting the obtained second image and information related to the obtained second image to the up-scaling DNN. The information related to the obtained second image may include either one or both of position information of pixels of the obtained second image and encoding parameter information.

The up-scaling DNN may include a plurality of convolution layers configured to sequentially perform a plurality of convolution operations on the obtained second image, and a bypass scaler configured to perform a scaling process on the obtained second image. The third image may be obtained based on a result of combining an output of the plurality of convolution layers and an output of the bypass scaler.

According to embodiments, an artificial intelligence (AI) encoding apparatus includes a memory storing one or more instructions, and a processor configured to execute the stored one or more instructions stored in the memory, to determine whether to perform AI down-scaling of an original image, based on the AI down-scaling of the original image being determined to be performed, obtain a first image by performing the AI down-scaling of the original image through a down-scaling deep neural network (DNN), obtain image data by encoding the obtained first image, and transmit the obtained image data and AI data including information indicating whether the obtained image data corresponds to an image of which the AI down-scaling is performed.

The processor may be further configured to execute the stored one or more instructions to determine whether to perform the AI down-scaling of the original image, based on any one or any combination of a resolution of the original image, a type of the original image, and a type of an object included in the original image.

The processor may be further configured to execute the stored one or more instructions to verify whether the down-scaling DNN is available, and based on the down-scaling DNN being verified to be available, determine to perform the AI down-scaling of the original image.

According to embodiments, an artificial intelligence (AI) decoding method includes obtaining image data corresponding to a first image that is encoded, obtaining a second image corresponding to the first image by decoding the obtained image data, determining whether to perform AI up-scaling of the obtained second image, based on the AI up-scaling of the obtained second image being determined to be performed, obtaining a third image by performing the AI up-scaling of the obtained second image through an up-scaling deep neural network (DNN), and outputting the obtained third image, and based on the AI up-scaling of the obtained second image being determined to be not performed, outputting the obtained second image.

A non-transitory computer-readable recording medium having recorded thereon a program that, when executed by a computer, may perform the AI decoding method.

An artificial intelligence (AI) encoding method includes determining whether to perform AI down-scaling of an original image, based on the AI down-scaling of the original image being determined to be performed, obtaining a first image by performing the AI down-scaling of the original image through a down-scaling deep neural network (DNN), obtaining image data by encoding the obtained first image; and transmitting the obtained image data and AI data including information indicating whether the obtained image data corresponds an image of which the AI down-scaling is performed.

A non-transitory computer-readable recording medium having recorded thereon a program that, when executed by a computer, may perform the AI decoding method.

According to embodiments, an artificial intelligence (AI) decoding apparatus includes a memory storing one or more instructions, and a processor configured to execute the stored one or more instructions, to obtain image data corresponding to a first image that is encoded, and AI data related to AI down-scaling of an original image into the first image through a first deep neural network (DNN), obtain a second image corresponding to the first image by decoding the obtained image data, determine whether to perform AI up-scaling of the obtained second image, based on the obtained AI data, based on the AI up-scaling of the obtained second image being determined to be performed, obtain a third image by performing the AI up-scaling of the obtained second image through a second DNN, and based on the AI up-scaling of the obtained second image being determined to be not performed, output the obtained second image.

The processor may be further configured to execute the stored one or more instructions to verify whether the first image is obtained by performing the AI down-scaling of the original image, based on the obtained AI data, and whether the second DNN is available, and based on the first image being verified to be obtained by performing the AI down-scaling of the original image, and based on the second DNN being verified to be available, determine to perform the AI up-scaling of the obtained second image.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and advantages of embodiments of the disclosure will be more apparent from the following description taken in conjunction with the accompanying drawings, in which:

FIG. 5 is a table showing a mapping relationship between several pieces of image-related information and several pieces of DNN setting information;

DETAILED DESCRIPTION

Figure 1A:
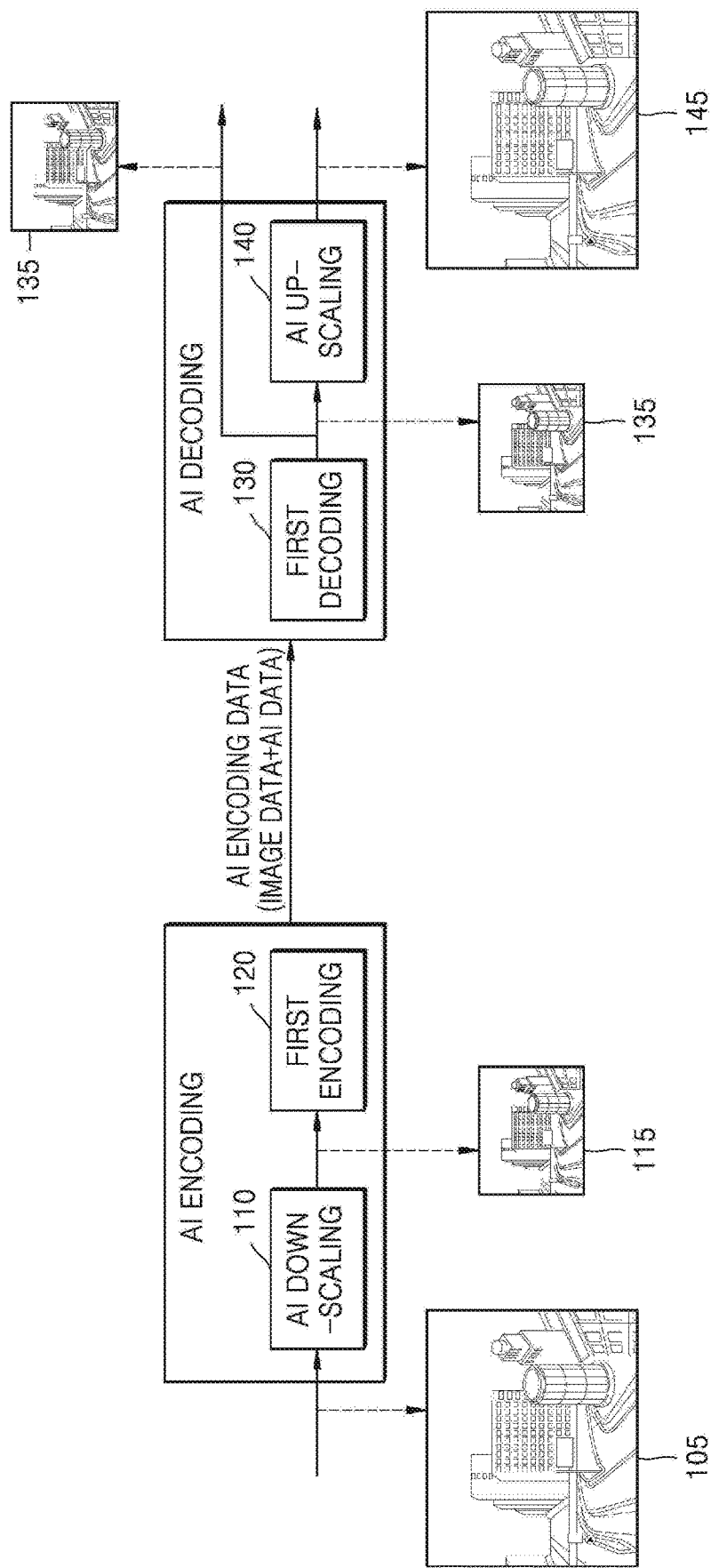
FIG. 1A is a diagram for describing an artificial intelligence (AI) encoding process and an AI decoding process, according to embodiments.

Embodiments of the disclosure provide apparatuses and methods for performing artificial intelligence (AI) encoding and AI decoding on an image, wherein an image is encoded and decoded based on AI to achieve a low bitrate.

As the disclosure allows for various changes and numerous examples, embodiments of the disclosure will be illustrated in the drawings and described in detail in the written description. However, this is not intended to limit the disclosure to modes of practice, and it will be understood that all changes, equivalents, and substitutes that do not depart from the spirit and technical scope of the disclosure are encompassed in the disclosure.

In the description of embodiments of the disclosure, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Throughout the disclosure, the expression "at least one of a, b or c" indicates only a, only b, only c, both a and b, both a and c, both b and c, all of a, b, and c, or variations thereof.

Also, in the present specification, an 'image' or a 'picture' may denote a still image, a moving image including a plurality of consecutive still images (or frames), or a video.

Also, in the present specification, a deep neural network (DNN) is a representative example of an artificial neural network model simulating brain nerves, and is not limited to an artificial neural network model using an algorithm.

Also, in the present specification, a 'parameter' is a value used in an operation process of each layer forming a neural network, and for example, may include a weight used when an input value is applied to an operation expression. Here, the parameter may be expressed in a matrix form. The parameter is a value set as a result of training, and may be updated through separate training data.

Also, in the present specification, a 'first DNN' indicates a DNN used for artificial intelligence (AI) down-scaling an image, and a 'second DNN' indicates a DNN used for AI up-scaling an image.

Also, in the present specification, 'DNN setting information' includes information related to an element constituting a DNN. 'DNN setting information' includes the parameter described above as information related to the element constituting the DNN. The first DNN or the second DNN may be set by using the DNN setting information.

Also, in the present specification, an 'original image' denotes an image to be an object of AI encoding, and a 'first image' denotes an image obtained as a result of performing AI down-scaling on the original image during an AI encoding process. Also, a 'second image' denotes an image obtained via first decoding during an AI decoding process, and a 'third image' denotes an image obtained by AI up-scaling the second image during the AI decoding process.

Also, in the present specification, 'AI down-scale' denotes a process of decreasing resolution of an image based on AI, and 'first encoding' denotes an encoding process according to an image compression method based on frequency transformation. Also, 'first decoding' denotes a decoding process according to an image reconstruction method based on frequency transformation, and 'AI up-scale' denotes a process of increasing resolution of an image based on AI.

FIG. 1A is a diagram for describing an AI encoding process and an AI decoding process, according to embodiments.

As described above, when resolution of an image remarkably increases, the throughput of information for encoding and decoding the image is increased, and accordingly, a method for improving efficiency of encoding and decoding of an image is required.

As shown in FIG. 1A, according to embodiments of the disclosure, a first image 115 is obtained by performing AI down-scaling 110 on an original image 105 having high resolution. Then, first encoding 120 and first decoding 130 are performed on the first image 115 having relatively low resolution, and thus a bitrate may be largely reduced compared to when the first encoding and the first decoding are performed on the original image 105.

In FIG. 1A, the first image 115 is obtained by performing the AI down-scaling 110 on the original image 105 and the first encoding 120 is performed on the first image 115 during the AI encoding process, according to embodiments. During the AI decoding process, AI encoding data including AI data and image data, which are obtained as a result of AI encoding is received, a second image 135 is obtained via the first decoding 130, and a third image 145 is obtained by performing AI up-scaling 140 on the second image 135.

Referring to the AI encoding process in detail, when the original image 105 is received, the AI down-scaling 110 is performed on the original image 105 to obtain the first image 115 of a resolution or a quality. Here, the AI down-scaling 110 is performed based on AI, and AI for the AI down-scaling 110 is trained jointly with AI for the AI up-scaling 140 of the second image 135. This is because, when the AI for the AI down-scaling 110 and the AI for the AI up-scaling 140 are separately trained, a difference between the original image 105 that is an object of AI encoding and the third image 145 reconstructed through AI decoding is increased.

In embodiments of the disclosure, the AI data may be used to maintain such a joint relationship during the AI encoding process and the AI decoding process. Accordingly, the AI data obtained through the AI encoding process may include information indicating an up-scaling target, and during the AI decoding process, the AI up-scaling 140 is performed on the second image 135 according to the up-scaling target verified based on the AI data.

The AI for the AI down-scaling 110 and the AI for the AI up-scaling 140 may be embodied as a DNN. As will be described later with reference to FIG. 18, because a first DNN and a second DNN are jointly trained by sharing loss information under a target, an AI encoding apparatus may provide target information used during joint training of the first DNN and the second DNN to an AI decoding apparatus, and the AI decoding apparatus may perform the AI up-scaling 140 on the second image 135 to target resolution based on the provided target information.

During the AI decoding process, the second image 135 may be output instead of the third image 145. A type of image output through the AI decoding process is determined based on the AI data. Whether to perform the AI up-scaling 140 on the second image 135 is determined based on the AI data, and when the AI up-scaling 140 is performed, the third image 145 is output during the AI decoding process and when the AI up-scaling 140 is not performed, the second image 135 obtained through the first decoding 130 is output. The second image 135 is output during the AI decoding process when the image data is obtained based on the original image 105, when a DNN for the AI up-scaling 140 is not existed, or when the DNN for the AI up-scaling 140 exists but not available. A type of image output through the AI decoding process will be described later with reference to FIG. 2.

Regarding the first encoding 120 and the first decoding 130 of FIG. 1A, information amount of the first image 115 obtained by performing AI down-scaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such first decoding 130 may be performed via an image reconstruction method corresponding to one of image compression methods using frequency transformation, such as MPEG-2, H.264 AVC, MPEG-4, HEVC, VC-1, VP8, VP9, and AV1, which is used in the first encoding 120.

The AI encoding data obtained through the AI encoding process may include the image data obtained as a result of performing the first encoding 120 on the first image 115, and the AI data related to the AI down-scaling 110 of the original image 105. The image data may be used during the first decoding 130 and the AI data may be used during the AI up-scaling 140.

The image data may be transmitted in a form of a bitstream. The image data may include data obtained based on pixel values in the first image 115, for example, residual data that is a difference between the first image 115 and prediction data of the first image 115. Also, the image data includes information used during the first encoding 120 performed on the first image 115. For example, the image data may include prediction mode information, motion information, and information related to quantization parameter used during the first encoding 120. The image data may be generated according to a rule, for example, according to a syntax, of an image compression method used during the first encoding 120, among MPEG-2, H.264 AVC, MPEG-4, HEVC, VC-1, VP8, VP9, and AV1.

The AI data is used in the AI up-scaling 140 based on the second DNN. As described above, because the first DNN and the second DNN are jointly trained, the AI data includes information enabling the AI up-scaling 140 to be performed accurately on the second image 135 through the second DNN. During the AI decoding process, the AI up-scaling 140 may be performed on the second image 135 to have targeted resolution and/or quality, based on the AI data.

The AI data may be transmitted together with the image data in a form of a bitstream. Alternatively, according to embodiments, the AI data may be transmitted separately from the image data, in a form of a frame or a packet. The AI data and the image data obtained as a result of the AI encoding may be transmitted through the same network or through different networks.

Figure 1B:
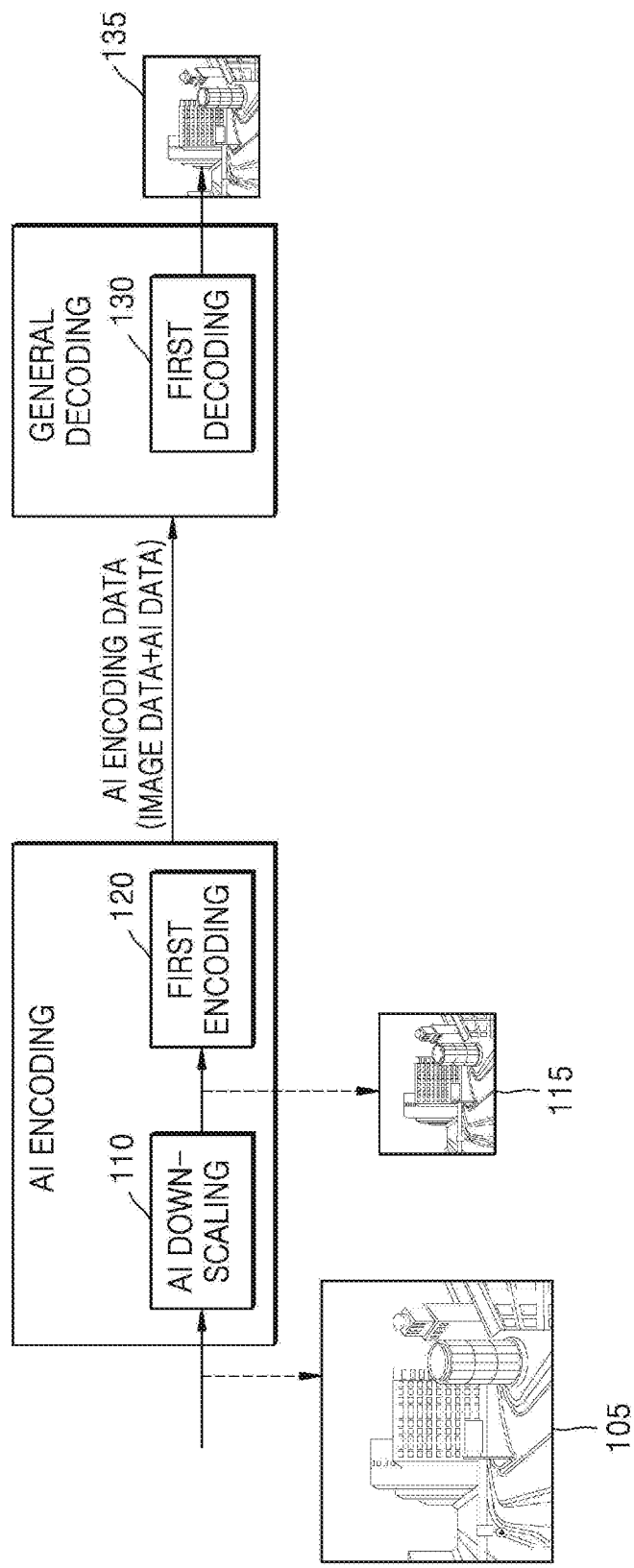
FIG. 1B is a diagram for describing an AI encoding process and a general decoding process, according to embodiments of the disclosure.

FIG. 1B is a diagram for describing an AI encoding process and a general decoding process, according to embodiments of the disclosure.

FIG. 1B is a diagram for describing a case in which a general decoding apparatus receiving AI encoding data is unable to perform an AI decoding process, and as shown in FIG. 1B, the general encoding process performs only the first decoding 130.

As described above, the AI encoding data including the image data and the AI data, which are obtained through the AI encoding process, is transmitted to the general decoding apparatus. Because the general decoding apparatus is unable to process the AI data, the general decoding apparatus outputs the second image 135 by performing the first decoding 130 only on the image data.

Figure 1C:
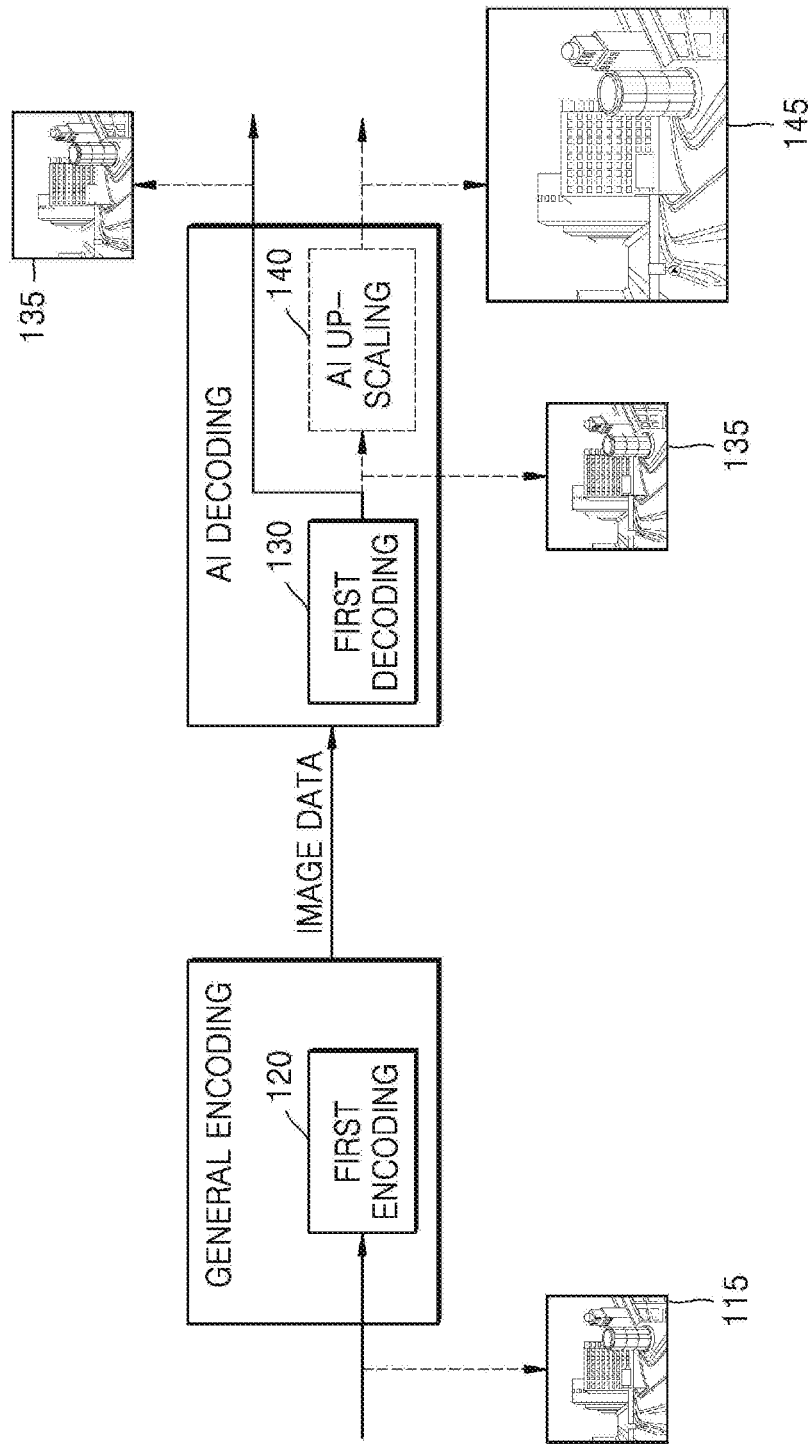
FIG. 1C is a diagram for describing a general encoding process and an AI decoding process, according to embodiments of the disclosure.

FIG. 1C is a diagram for describing a general encoding process and an AI decoding process, according to embodiments of the disclosure.

FIG. 1C is a diagram for describing a case in which an apparatus for encoding the first image 115 is unable to perform an AI encoding process, and as shown in FIG. 1C, a general encoding process performs only the first encoding 120.

The general encoding apparatus transmits the image data to an AI decoding apparatus by performing the first encoding 120 on the first image 115. Here, the first image 115 may not be AI down-scaled image, that is, the first image 115 may be an original image. Because the general encoding apparatus is unable to perform the AI encoding process, the AI data is not transmitted from the general encoding apparatus to the AI decoding apparatus. Because received data does not include the AI data, the AI decoding apparatus does not perform the AI up-scaling 140, but outputs the second image 135 by performing the first decoding 130 on the image data. In other words, the AI decoding apparatus may output the second image 135 or output the third image 145, based on whether data received from the AI encoding apparatus includes the AI data.

Hereinafter, the AI decoding apparatus performing the AI decoding process will be described in detail with reference to FIG. 2.

Figure 2:
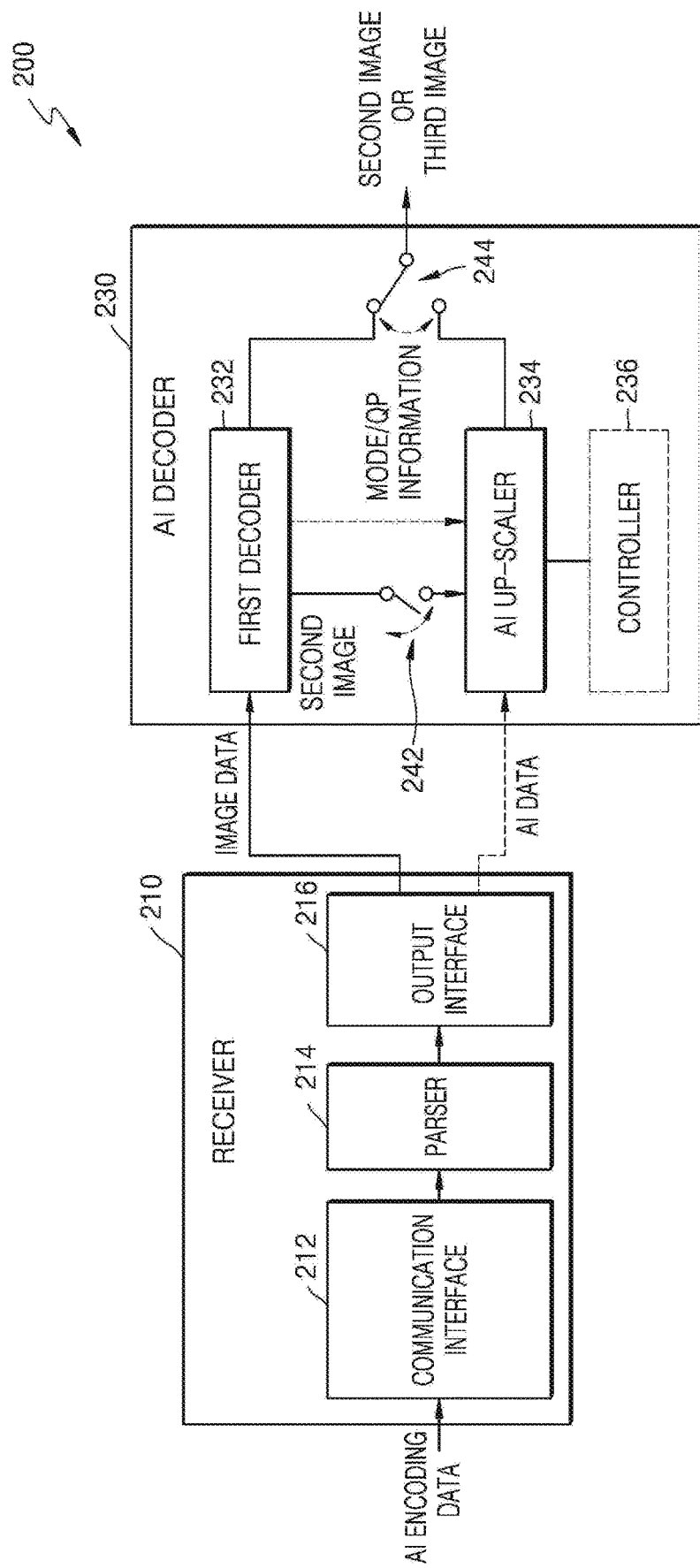
FIG. 2 is a block diagram of a configuration of an AI decoding apparatus according to embodiments of the disclosure.

FIG. 2 is a block diagram of a configuration of an AI decoding apparatus 200 according to embodiments.

Referring to FIG. 2, the AI decoding apparatus 200 according to embodiments may include a receiver 210 and an AI decoder 230. The receiver 210 may include a communication interface 212, a parser 214, and an output interface 216. The AI decoder 230 may include a first decoder 232 and an AI up-scaler 234. The AI decoder 230 may further include a controller 236.

In FIG. 2, the receiver 210 and the AI decoder 230 according to embodiments are described as individual devices, but may be implemented through one processor. In this case, the receiver 210 and the AI decoder 230 may be implemented through an dedicated processor or through a combination of software and general-purpose processor such as application processor (AP), central processing unit (CPU) or graphic processing unit (GPU). The dedicated processor may be implemented by including a memory for implementing embodiments of the disclosure or by including a memory processor for using an external memory.

Also, the receiver 210 and the AI decoder 230 may be configured by a plurality of processors. In this case, the receiver 210 and the AI decoder 230 may be implemented through a combination of dedicated processors or through a combination of software and general-purpose processors such as AP, CPU or GPU. Similarly, the AI up-scaler 234 and the first decoder 232 may be implemented by different processors.

The receiver 210 receives and parses AI encoding data obtained as a result of AI encoding, and distinguishably outputs image data and AI data to the AI decoder 230.

The communication interface 212 receives the AI encoding data obtained as the result of AI encoding through a network. The AI encoding data obtained as the result of performing AI encoding includes the image data and the AI data. The image data and the AI data may be received through a same type of network or different types of networks. The communication interface 212 may receive only the image data through a network. In other words, as described above with reference to FIG. 1C, when the general encoding is performed by the general encoding apparatus, the communication interface 212 may only receive the image data from the general encoding apparatus.

The parser 214 receives the AI encoding data received through the communication interface 212 and parses the AI encoding data to distinguish the image data and the AI data. For example, the parser 214 may distinguish the image data and the AI data by reading a header of data obtained from the communication interface 212. According to embodiments, the parser 214 distinguishably transmits the image data and the AI data to the output interface 216 via the header of the data received through the communication interface 212, and the output interface 216 transmits the distinguished image data and AI data respectively to the first decoder 232 and the AI up-scaler 234. At this time, it may be verified that the image data included in the AI encoding data is image data generated via a codec (for example, MPEG-2, H.264 AVC, MPEG-4, HEVC, VC-1, VP8, VP9, or AV1). In this case, corresponding information may be transmitted to the first decoder 232 through the output interface 216 such that the image data is processed via the verified codec.

According to embodiments, the AI encoding data parsed by the parser 214 may be obtained from a data storage medium including a magnetic medium such as a hard disk, a floppy disk, or a magnetic tape, an optical recording medium such as CD-ROM or DVD, or a magneto-optical medium such as a floptical disk.

FIG. 2 shows a line indicating a flow of AI data provided from the output interface 216 to the AI up-scaler 234 in a broken line, which indicates that when the AI encoding data received by the communication interface 212 does not include the AI data, the AI data may not be transmitted to the AI up-scaler 234.

The first decoder 232 reconstructs the second image 135 corresponding to the first image 115, based on the image data. When a second switch 244 is not connected to the first decoder 232, the second image 135 generated by the first decoder 232 is provided to the AI up-scaler 234. According to embodiments, first decoding related information, such as prediction mode information, motion information, quantization parameter information, or the like included in the image data may be further provided to the AI up-scaler 234. The AI up-scaler 234 may control a type of image to be output from the AI decoder 230, based on the received AI data. Accordingly, the AI up-scaler 234 may control a type of data output through the AI decoder 230 by controlling a first switch 242 and the second switch 244.

The first switch 242 and the second switch 244 shown in FIG. 2 are for understanding of embodiments of the disclosure, and it does not indicate that the first switch 242 and the second switch 244 having physical configurations are included in the AI decoder 230. In other words, it is described that operations of the first switch 242 and the second switch 244 are controlled by the AI up-scaler 234, but the AI up-scaler 234 may control the type of data output from the AI decoder 230 according to a program or an instruction. According to embodiments of the disclosure, the controller 236 may control the first switch 242 and the second switch 244. In this case, the controller 236 may control the operations of the first switch 242 and the second switch 244, based on availability of the AI data and a second DNN.

Initially, the first switch 242 may be in an off state and the second switch 244 may be connected to the first decoder 232. In other words, as a default state, the first switch 242 may be on an off state and the second switch 244 may be connected to the first decoder 232. Upon receiving the AI data from the output interface 216, the AI up-scaler 234 may change states of the first switch 242 and the second switch 244, based on the AI data.

As described above, when the AI data is not included in the AI encoding data, the first switch 242 maintains the off state and the second switch 244 maintains being connected to the first decoder 232, and the second image 135 generated based on the image data may be output from the AI decoder 230.

According to embodiments of the disclosure, when the AI data is received from the output interface 216, the AI up-scaler 234 may verify whether the first image 115 is generated through the first DNN. Accordingly, the AI data may include information indicating whether the first image 115 is generated through the first DNN. For example, when the first image 115 is generated through the first DNN, the AI data may include a flag indicating that the first image 115 is generated through the first DNN, and on the other hand, when the first image 115 is not generated through the first DNN (in other words, when the first image 115 is the same as the original image 105), the AI data may include a flag indicating that the first image 115 is not generated through the first DNN.

When it is verified that the first image 115 is generated through the first DNN, based on the AI data, the AI up-scaler 234 may control the first switch 242 to be in an on state and control the second switch 244 to be connected to the AI up-scaler 234. Accordingly, the first decoder 232 transmits the second image 135 reconstructed via the first decoding to the AI up-scaler 234 and the AI up-scaler 234 outputs the third image 145 by performing the AI up-scaling on the second image 135. When the first switch 242 is in an on state, for example, the prediction mode information, the motion information, the quantization parameter information or the like, included in the image data may be transmitted from the first decoder 232 to the AI up-scaler 234.

When it is verified that the first image 115 is not generated through the first DNN, based on the AI data, the AI up-scaler 234 may control the first switch 242 to be in the off state and control the second switch 244 to be connected to the first decoder 232. Accordingly, the second image 135 generated by the first decoder 232 may be output as an output of the AI decoder 230.

As described above, because the AI data includes the information used for the AI up-scaling, when the first image 115 is not generated through the first DNN, the AI up-scaling is not needed to be performed on the second image 135, and accordingly, the second image 135 generated by the first decoder 232 may output as it is.

According to embodiments of the disclosure, when it is verified that the first image 115 is generated through the first DNN but the second DNN is not available, the AI up-scaler 234 may control the first switch 242 in the off state and control the second switch 244 to be connected to the first decoder 232. Accordingly, the second image 135 generated by the first decoder 232 may be output as the output of the AI decoder 230.

Here, a case in which the second DNN is not available may include a case in which the second DNN is not stored in the AI up-scaler 234, and a case in which, even when the second DNN is stored in the AI up-scaler 234, DNN setting information for performing the AI up-scaling on the second image 135 is not stored. As will be described later, when DNN setting information is used for the AI down-scaling, the AI up-scaling is performed on the second image 135 by using DNN setting information connected to the DNN setting information used for the AI down-scaling, and thus when the DNN setting information for performing the AI up-scaling on the second image 135 is not stored, it is determined that the second DNN is not available.

Also, the case in which the second DNN is not available may also include a case in which a version of the second DNN and/or DNN setting information stored in the AI up-scaler 234 is not the latest version. According to embodiments of the disclosure, the AI decoding apparatus 200 may receive and store the second DNN and the DNN setting information from an external server through a network, and when either one or both of the second DNN and the DNN setting information stored in the AI decoding apparatus 200 is not the latest version, the AI up-scaler 234 may determine that the second DNN is not available.

According to embodiments of the disclosure, when it is verified that the first image 115 is generated through the first DNN but the second DNN is not available, the AI up-scaler 234 may control the first switch 242 in the off state and control the second switch 244 to be connected to the first decoder 232, thereby enabling the second image 135 to be output through the AI decoder 230.

According to embodiments of the disclosure, when it is verified that the first image 115 is generated through the first DNN but the second DNN is not available, the AI up-scaler 234 may control the first switch 242 in the on state and control the second switch 244 to be connected to the AI up-scaler 234. Because the second DNN is not available, the AI up-scaler 234 does not perform the AI up-scaling on the second image 135, but because the second image 135 of which resolution is reduced compared to the original image 105 may be displayed, the AI up-scaler 234 may output the second image 135 received from the first decoder 232 while requesting the display apparatus (for example, a quality engine of the display apparatus) to perform up-scaling on the second image 135. According to embodiments of the disclosure, when it is verified that the first image 115 is generated through the first DNN but the second DNN is not available, the AI up-scaler 234 may perform legacy up-scaling on the second image 135 and then output the legacy up-scaled second image 135. A legacy scaling method is a scaling method that does not use a DNN, and for example, may include any one or any combination of a bi-linear scaling method, a bi-cubic scaling method, a lanczos scaling method, or a stair step scaling method.

When the second image 135 or the third image 145 are output from the AI decoder 230, the second image 135 or the third image 145 may be output to the display apparatus to be displayed as it is or output to the display apparatus to be displayed after being post-processed. In other words, the third image 145 or the post-processed third image 145 may be displayed, or the second image 135 or the post-processed second image 135 may be displayed.

Upon receiving the AI data, the AI up-scaler 234 performs AI up-scaling on the second image 135, based on the AI data. According to embodiments, the AI up-scaling may be performed by further using the first decoding related information, such as the prediction mode information, the quantization parameter information, or the like included in the image data. As described above, the AI up-scaling is performed when the first image 115 is generated through the first DNN and the second DNN is available.

The AI data provided to the AI up-scaler 234 includes information enabling the second image 135 to be processed via AI up-scaling. Here, an up-scaling target may correspond to down-scaling of a first DNN. Accordingly, the AI data includes information for verifying a down-scaling target of the first DNN.

The AI data may include difference information between resolution of the original image 105 and resolution of the first image 115. Also, the AI data may include information related to the first image 115. In addition, the AI data may include resolution information of the third image 145 to be generated by the AI decoding apparatus 200.

The difference information may be expressed as information about a resolution conversion degree of the first image 115 compared to the original image 105 (for example, resolution conversion rate information). Also, because the resolution of the first image 115 is verified through the resolution of the reconstructed second image 135, the difference information may be expressed only as resolution information of the original image 105. Here, the resolution information may be expressed as vertical/horizontal sizes or as a ratio (16:9, 4:3, or the like) and a size of one axis. Also, when there is pre-set resolution information, the resolution information may be expressed in a form of an index or flag.

The information related to the first image 115 may include information about any one or any combination of a bitrate of the image data obtained as the result of performing first encoding on the first image 115 and a codec type used during the first encoding of the first image 115.

The difference information and the information related to the first image 115 may be transmitted as one piece of AI data or may be individually transmitted.

The AI up-scaler 234 may determine the up-scaling target of the second image 135, based on any one or any combination of the difference information, the information related to the first image 115, and the resolution information of the third image 145, which are included in the AI data. The up-scaling target may indicate, for example, to what degree resolution is to be up-scaled for the second image 135. When the up-scaling target is determined, the AI up-scaler 234 performs AI up-scaling on the second image 135 through a second DNN to obtain the third image 145 corresponding to the up-scaling target.

According to embodiments of the disclosure, the AI up-scaler 234 may further input reference information to the second DNN together with the second image 135, to perform the AI up-scaling on the second image 135. The reference information may be input to the second DNN for effective AI up-scaling of the second image 135. The reference information may include, for example, any one or any combination of position information of pixels included in the second image 135 and encoding parameter information generated during the first encoding of the original image 105 or the first image 115.

The position information of the pixels included in the second image 135 may include a position map of the second image 135, and each of samples of the position map may have a value corresponding to a position of each pixel in the second image 135.

Also, the encoding parameter information may include various encoding parameter maps that may be generated during the first encoding of the original image 105, such as a motion vector map, an intra mode map, a residual distribution map, a prediction motion vector map, and an SAO parameter map according to data units (a largest coding unit, a coding unit, a prediction unit, a transformation unit, or a pixel unit) of the original image 105. Each sample in the encoding parameter map may have a value corresponding to an encoding parameter generated in a data unit to which each sample belongs. According to embodiments of the disclosure, the encoding parameter information may be transmitted to the AI decoding apparatus 200 by being included in the AI data.

As will be described later with reference to FIG. 18, the reference information may be input to the second DNN for training of the second DNN. The second DNN may optimize parameters based on a relationship according to positions between a map corresponding to the reference information and an input image (a first training image 1702 or a second training image) (for example, a relationship between a sample value at a position of the map and a pixel value at a position of the input image). Accordingly, when the second image 135 and the map corresponding to the reference information are input to the second DNN for the AI up-scaling of the second image 135, the second DNN may further accurately perform the AI up-scaling on the second image 135 in consideration of a relationship according to positions between the second image 135 and the map corresponding to the reference information. According to embodiments of the disclosure, when the second DNN performs a convolution operation on the second image 135 in consideration of the map corresponding to the reference information, the second DNN may change sample values of a feature map 450 (see FIG. 4) regarding a position of the second image 135 (for example, a position where a motion vector value is equal to or greater than a reference value). For example, as will be described later with reference to FIG. 4, when the convolution operation is performed at the position of the second image 135, at least one value among M1 through M9 that are sample values of the feature map 450 may be changed.

Before describing a method, performed by the AI up-scaler 234, of performing AI up-scaling on the second image 135 according to the up-scaling target, an AI up-scaling process through the second DNN will be described with reference to FIGS. 3 and 4.

Figure 3:
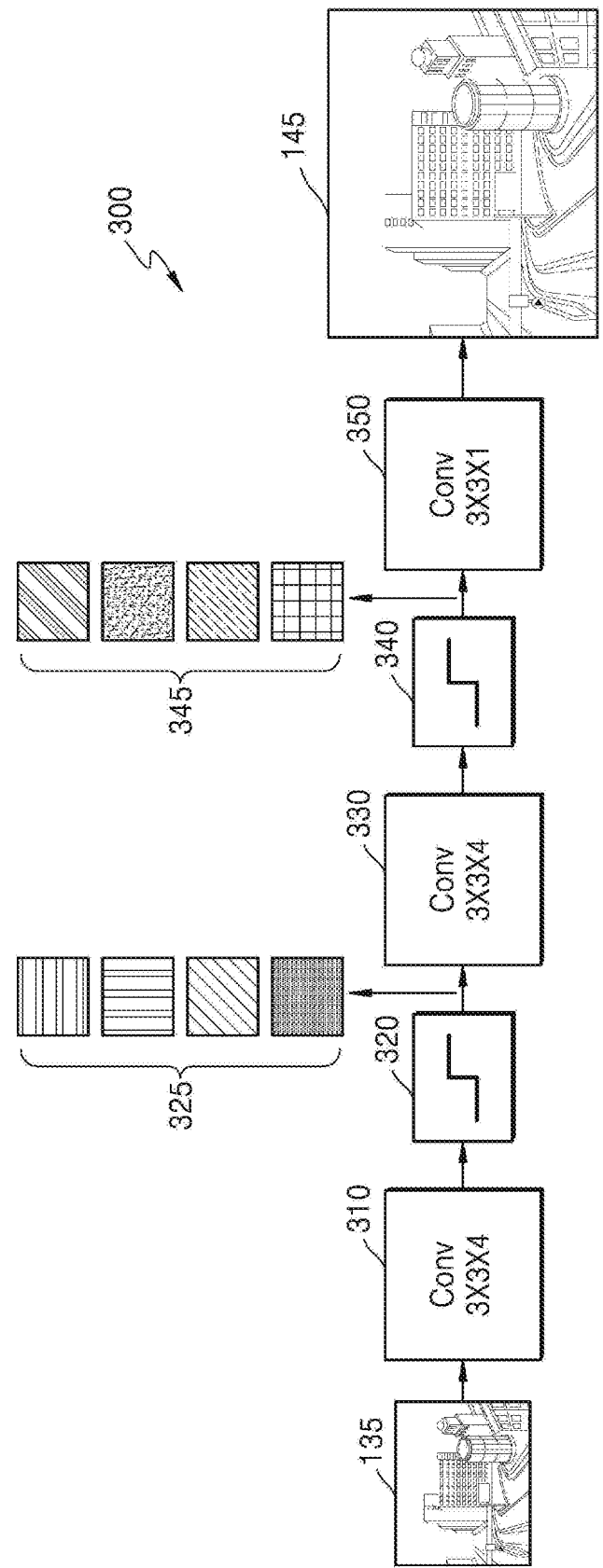
FIG. 3 is a diagram showing a second deep neural network (DNN) for performing AI up-scaling on a second image.
Figure 4:
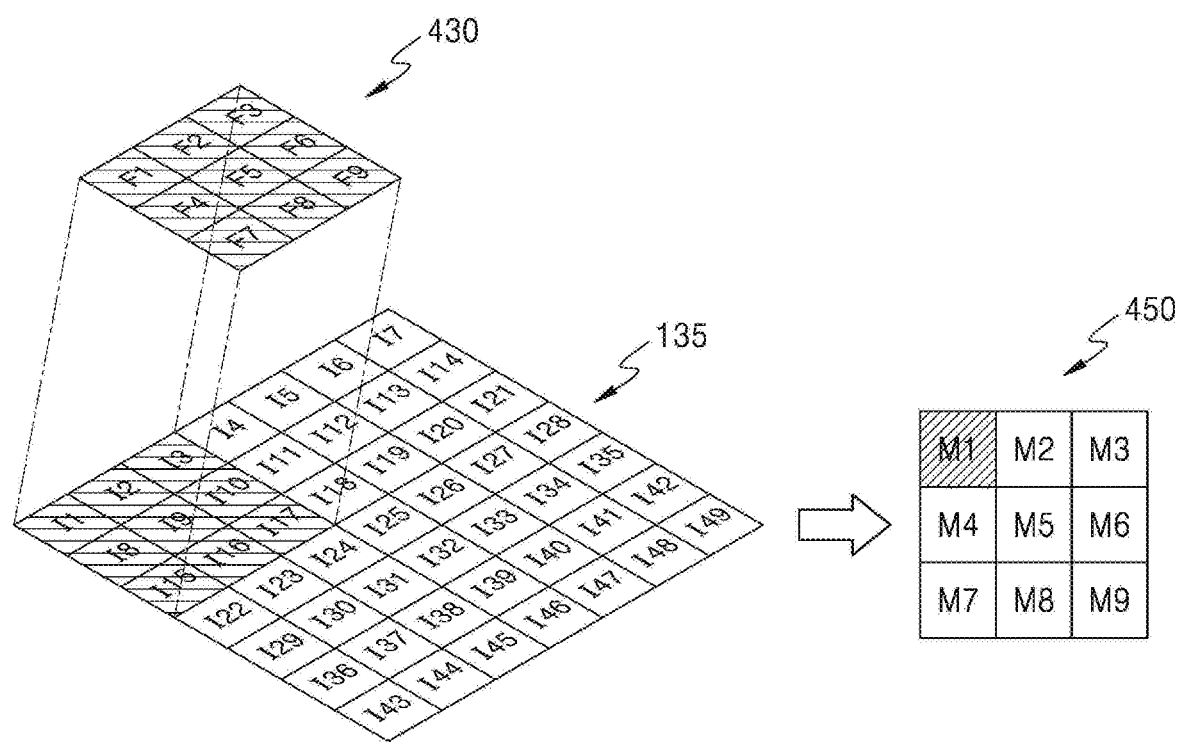
FIG. 4 is a diagram for describing a convolution operation performed by a convolution layer.

FIG. 3 is a diagram showing a second DNN 300 for performing AI up-scaling on the second image 135, and FIG. 4 is a diagram for describing a convolution operation in a first convolution layer 310 of FIG. 3.

As shown in FIG. 3, the second image 135 is input to the first convolution layer 310. 3×3×4 indicated in the first convolution layer 310 shown in FIG. 3 indicates that a convolution process is performed on one input image by using four filter kernels having a size of 3×3. Four feature maps are generated by the four filter kernels as a result of the convolution process. Each feature map indicates inherent characteristics of the second image 135. For example, each feature map may represent a vertical direction characteristic, a horizontal direction characteristic, or an edge characteristic, etc. of the second image 135.

A convolution operation in the first convolution layer 310 will be described in detail with reference to FIG. 4.

One feature map 450 may be generated through multiplication and addition between parameters of a filter kernel 430 having a size of 3×3 used in the first convolution layer 310 and corresponding pixel values in the second image 135. Because four filter kernels are used in the first convolution layer 310, four feature maps may be generated through the convolution operation using the four filter kernels.

I1 through I49 indicated in the second image 135 in FIG. 4 indicate pixels in the second image 135, and F1 through F9 indicated in the filter kernel 430 indicate parameters of the filter kernel 430. Also, M1 through M9 indicated in the feature map 450 indicate samples of the feature map 450.

In FIG. 4, the second image 135 includes 49 pixels, but the number of pixels is only an example and when the second image 135 has a resolution of 4 K, the second image 135 may include, for example, 3840×2160 pixels.

During a convolution operation process, pixel values of I1, I2, I3, I8, I9, I10, I15, I16, and I17 of the second image 135 and F1 through F9 of the filter kernels 430 are respectively multiplied, and a value of combination (for example, addition) of result values of the multiplication may be assigned as a value of M1 of the feature map 450. When a stride of the convolution operation is 2, pixel values of I3, I4, I5, I10, I11, I12, I17, I18, and I19 of the second image 135 and F1 through F9 of the filter kernels 430 are respectively multiplied, and the value of the combination of the result values of the multiplication may be assigned as a value of M2 of the feature map 450.

While the filter kernel 430 moves along the stride to the last pixel of the second image 135, the convolution operation is performed between the pixel values in the second image 135 and the parameters of the filter kernel 430, and thus the feature map 450 having a size may be generated.

According to the disclosure, values of parameters of a second DNN, for example, values of parameters of a filter kernel used in convolution layers of the second DNN (for example, F1 through F9 of the filter kernel 430), may be optimized through joint training of a first DNN and the second DNN. As described above, the AI up-scaler 234 may determine an up-scaling target corresponding to a down-scaling target of the first DNN based on AI data, and determine parameters corresponding to the determined up-scaling target as the parameters of the filter kernel used in the convolution layers of the second DNN.

Convolution layers included in the first DNN and the second DNN may perform processes according to the convolution operation process described with reference to FIG. 4, but the convolution operation process described with reference to FIG. 4 is only an example and is not limited thereto.

Referring back to FIG. 3, the feature maps output from the first convolution layer 310 may be input to a first activation layer 320.

The first activation layer 320 may assign a non-linear feature to each feature map. The first activation layer 320 may include a sigmoid function, a Tanh function, a rectified linear unit (ReLU) function, or the like, but is not limited thereto.

The first activation layer 320 assigning the non-linear feature indicates that at least one sample value of the feature map, which is an output of the first convolution layer 310, is changed. Here, the change is performed by applying the non-linear feature.

The first activation layer 320 determines whether to transmit sample values of the feature maps output from the first convolution layer 310 to a second convolution layer 330. For example, some of the sample values of the feature maps are activated by the first activation layer 320 and transmitted to the second convolution layer 330, and some of the sample values are deactivated by the first activation layer 320 and not transmitted to the second convolution layer 330. The intrinsic characteristics of the second image 135 represented by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

3×3×4 indicated in the second convolution layer 330 indicates that a convolution process is performed on the feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. 3×3×1 indicated in the third convolution layer 350 shown in FIG. 3 indicates that a convolution process is performed to generate one output image by using one filter kernel having a size of 3×3. The third convolution layer 350 is a layer for outputting a final image and generates one output by using one filter kernel. According to embodiments of the disclosure, the third convolution layer 350 may output the third image 145 as a result of a convolution operation.

There may be a plurality of pieces of DNN setting information indicating the numbers of filter kernels of the first, second, and third convolution layers 310, 330, and 350 of the second DNN 300, a parameter of filter kernels of the first, second, and third convolution layers 310, 330, and 350 of the second DNN 300, and the like, as will be described later, and the plurality of pieces of DNN setting information may be connected to a plurality of pieces of DNN setting information of a first DNN. The connection between the plurality of pieces of DNN setting information of the second DNN and the plurality of pieces of DNN setting information of the first DNN may be realized via joint training of the first DNN and the second DNN.

In FIG. 3, the second DNN 300 includes three convolution layers (the first, second, and third convolution layers 310, 330, and 350) and two activation layers (the first and second activation layers 320 and 340), but this is only an example, and the numbers of convolution layers and activation layers may vary according to embodiments. Also, according to embodiments, the second DNN 300 may be implemented as a recurrent neural network (RNN). In this case, a convolutional neural network (CNN) structure of the second DNN 300 according to embodiments of the disclosure is changed to an RNN structure.

According to embodiments, the AI up-scaler 234 may include at least one arithmetic logic unit (ALU) for the convolution operation and the operation of the activation layer described above. The ALU may be implemented as a processor. For the convolution operation, the ALU may include a multiplier that performs multiplication between sample values of the second image 135 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result and a value to determine whether to transmit the input sample value to a next layer.

Hereinafter, a method, performed by the AI up-scaler 234, of performing the AI up-scaling on the second image 135 according to the up-scaling target will be described.

According to embodiments, the AI up-scaler 234 may store a plurality of pieces of DNN setting information settable in a second DNN.

Here, the DNN setting information may include information about any one or any combination of the number of convolution layers included in the second DNN, the number of filter kernels for each convolution layer, and a parameter of each filter kernel. The plurality of pieces of DNN setting information may respectively correspond to various up-scaling targets, and the second DNN may operate based on DNN setting information corresponding to an up-scaling target. The second DNN may have different structures based on the DNN setting information. For example, the second DNN may include three convolution layers based on any piece of DNN setting information, and may include four convolution layers based on another piece of DNN setting information.

According to embodiments, the DNN setting information may only include a parameter of a filter kernel used in the second DNN. In this case, the structure of the second DNN does not change, but only the parameter of the internal filter kernel may change based on the DNN setting information.

The AI up-scaler 234 may obtain the DNN setting information for performing AI up-scaling on the second image 135, among the plurality of pieces of DNN setting information. Each of the plurality of pieces of DNN setting information used at this time is information for obtaining the third image 145 of pre-determined resolution and/or pre-determined quality, and is trained jointly with a first DNN.

For example, one piece of DNN setting information among the plurality of pieces of DNN setting information may include information for obtaining the third image 145 of resolution twice higher than resolution of the second image 135, for example, the third image 145 of 4 K (4096×2160) twice higher than 2 K (2048×1080) of the second image 135, and another piece of DNN setting information may include information for obtaining the third image 145 of resolution four times higher than the resolution of the second image 135, for example, the third image 145 of 8 K (8192×4320) four times higher than 2 K (2048×1080) of the second image 135.

Figure 13:
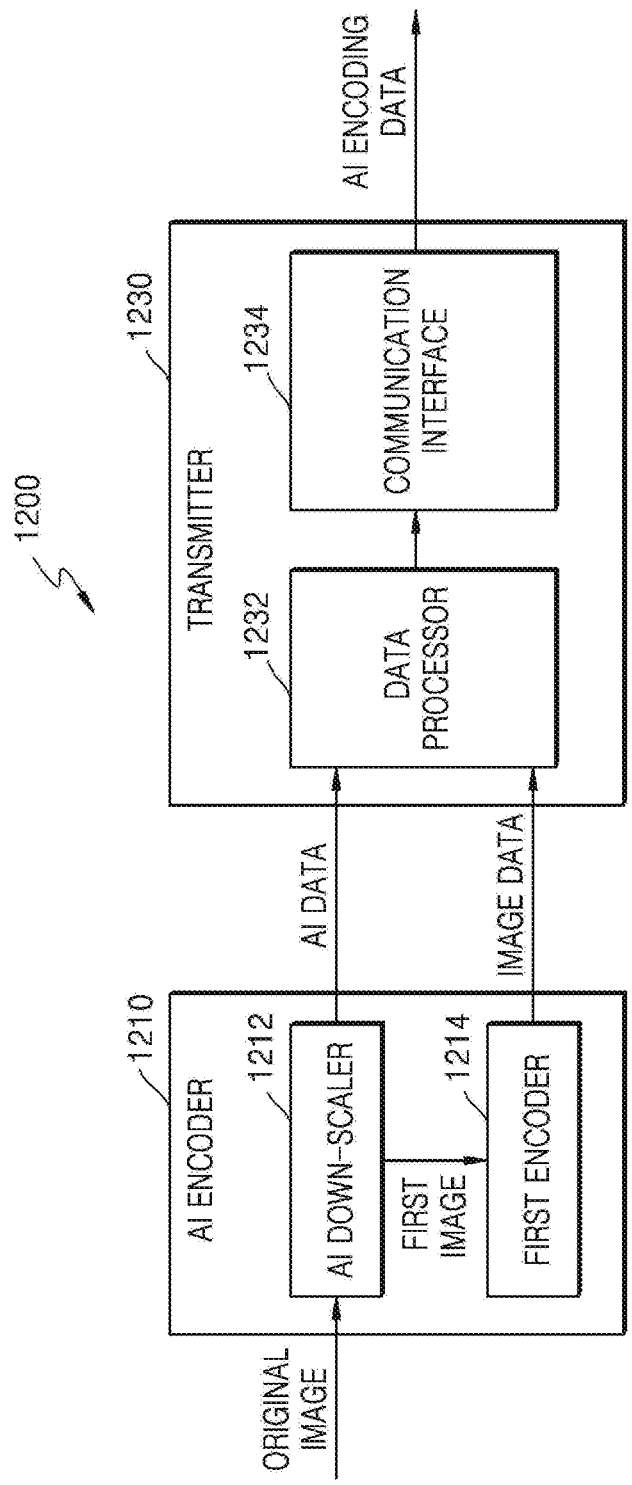
FIG. 13 is a block diagram of a configuration of an AI encoding apparatus according to embodiments of the disclosure.

Each of the plurality of pieces of DNN setting information is obtained jointly with DNN setting information of the first DNN of an AI encoding apparatus 1200 of FIG. 13, and the AI up-scaler 234 obtains one piece of DNN setting information among the plurality of pieces of DNN setting information according to an enlargement ratio corresponding to a reduction ratio of the DNN setting information of the first DNN. In this regard, the AI up-scaler 234 may verify information of the first DNN. In order for the AI up-scaler 234 to verify the information of the first DNN, the AI decoding apparatus 200 according to embodiments receives AI data including the information of the first DNN from the AI encoding apparatus 1200.

In other words, the AI up-scaler 234 may verify information targeted by DNN setting information of the first DNN used to obtain the first image 115 and obtain the DNN setting information of the second DNN trained jointly with the DNN setting information of the first DNN, by using information received from the AI encoding apparatus 1200.

When DNN setting information for performing the AI up-scaling on the second image 135 is obtained from among the plurality of pieces of DNN setting information, input data may be processed based on the second DNN operating according to the obtained DNN setting information.

For example, when any one piece of DNN setting information is obtained, the number of filter kernels included in each of the first, second, and third convolution layers 310, 330, and 350 of the second DNN 300 of FIG. 3, and the parameters of the filter kernels are set to values included in the obtained DNN setting information.

Parameters of a filter kernel of 3×3 used in any one convolution layer of the second DNN of FIG. 4 are set to {1, 1, 1, 1, 1, 1, 1, 1, 1}, and when DNN setting information is changed afterwards, the parameters are replaced by {2, 2, 2, 2, 2, 2, 2, 2, 2} that are parameters included in the changed DNN setting information.

The AI up-scaler 234 may obtain the DNN setting information for AI up-scaling from among the plurality of pieces of DNN setting information, based on information included in the AI data, and the AI data used to obtain the DNN setting information will now be described.

According to embodiments, the AI up-scaler 234 may obtain the DNN setting information for AI up-scaling from among the plurality of pieces of DNN setting information, based on difference information included in the AI data. For example, when it is verified that the resolution (for example, 4 K (4096×2160)) of the original image 105 is twice higher than the resolution (for example, 2 K (2048×1080)) of the first image 115, based on the difference information, the AI up-scaler 234 may obtain the DNN setting information for increasing the resolution of the second image 135 two times.

According to another embodiment, the AI up-scaler 234 may obtain the DNN setting information for AI up-scaling the second image 135 from among the plurality of pieces of DNN setting information, based on information related to the first image 115 included in the AI data. The AI up-scaler 234 may pre-determine a mapping relationship between image-related information and DNN setting information, and obtain the DNN setting information mapped to the information related to the first image 115.

FIG. 5 is a table showing a mapping relationship between several pieces of image-related information and several pieces of DNN setting information.

Through embodiments according to FIG. 5, it will be determined that AI encoding and AI decoding processes according to embodiments of the disclosure do not only consider a change of resolution. As shown in FIG. 5, DNN setting information may be selected considering resolution, such as standard definition (SD), high definition (HD), or full HD, a bitrate, such as 10 Mbps, 15 Mbps, or 20 Mbps, and codec information, such as AV1, H.264, or HEVC, individually or collectively. For such consideration of the resolution, the bitrate and the codec information, training in consideration of each element may be jointly performed with encoding and decoding processes during an AI training process (see FIG. 18).

Accordingly, when a plurality of pieces of DNN setting information are provided based on image-related information including a codec type, resolution of an image, and the like, as shown in FIG. 5 according to training, the DNN setting information for AI up-scaling the second image 135 may be obtained based on the information related to the first image 115 received during the AI decoding process.

In other words, the AI up-scaler 234 is capable of using DNN setting information according to image-related information by matching the image-related information at the left of a table of FIG. 5 and the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via AV1 codec, the AI up-scaler 234 may use A DNN setting information among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed via H.264 codec, the AI up-scaler 234 may use B DNN setting information among the plurality of pieces of DNN setting information.

Also, when it is verified, from the information related to the first image 115, that the resolution of the first image 115 is full HD, the bitrate of the image data obtained as the result of performing the first encoding is 20 Mbps, and the first encoding is performed via HEVC codec, the AI up-scaler 234 may use C DNN setting information among the plurality of pieces of DNN setting information, and when it is verified that the resolution of the first image 115 is full HD, the bitrate of the image data obtained as the result of performing the first encoding is 15 Mbps, and the first encoding is performed via HEVC codec, the AI up-scaler 234 may use D DNN setting information among the plurality of pieces of DNN setting information. One of the C DNN setting information and the D DNN setting information is selected based on whether the bitrate of the image data obtained as the result of performing the first encoding on the first image 115 is 20 Mbps or 15 Mbps. The different bitrates of the image data, obtained when the first encoding is performed on the first image 115 of the same resolution via the same codec, indicates different qualities of reconstructed images. Accordingly, a first DNN and a second DNN may be jointly trained based on an image quality, and accordingly, the AI up-scaler 234 may obtain DNN setting information according to a bitrate of image data indicating the quality of the second image 135.

According to another embodiment, the AI up-scaler 234 may obtain the DNN setting information for performing AI up-scaling on the second image 135 from among the plurality of pieces of DNN setting information considering both information (prediction mode information, motion information, quantization parameter information, and the like) provided from the first decoder 232 and the information related to the first image 115 included in the AI data. For example, the AI up-scaler 234 may receive quantization parameter information used during a first encoding process of the first image 115 from the first decoder 232, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 232 are/is considered together, compared to when only the AI data is used.

Also, according to embodiments, the AI data may include an identifier of mutually agreed DNN setting information. An identifier of DNN setting information is information for distinguishing a pair of pieces of DNN setting information jointly trained between the first DNN and the second DNN, such that AI up-scaling is performed on the second image 135 to the up-scaling target corresponding to the down-scaling target of the first DNN. The AI up-scaler 234 may perform AI up-scaling on the second image 135 by using the DNN setting information corresponding to the identifier of the DNN setting information, after obtaining the identifier of the DNN setting information included in the AI data. For example, identifiers indicating each of the plurality of DNN setting information settable in the first DNN and identifiers indicating each of the plurality of DNN setting information settable in the second DNN may be previously designated. In this case, the same identifier may be designated for a pair of DNN setting information settable in each of the first DNN and the second DNN. The AI data may include an identifier of DNN setting information set in the first DNN for AI down-scaling of the original image 105. The AI up-scaler 234 that receives the AI data may perform AI up-scaling on the second image 135 by using the DNN setting information indicated by the identifier included in the AI data among the plurality of DNN setting information.

Also, according to embodiments, the AI data may include the DNN setting information. The AI up-scaler 234 may perform AI up-scaling on the second image 135 by using the DNN setting information after obtaining the DNN setting information included in the AI data.

According to embodiments, when pieces of information (for example, the number of convolution layers, the number of filter kernels for each convolution layer, a parameter of each filter kernel, and the like) constituting the DNN setting information are stored in a form of a lookup table, the AI up-scaler 234 may obtain the DNN setting information by combining some values selected from values in the lookup table, based on information included in the AI data, and perform AI up-scaling on the second image 135 by using the obtained DNN setting information.

According to embodiments, when a structure of DNN corresponding to the up-scaling target is determined, the AI up-scaler 234 may obtain the DNN setting information, for example, parameters of a filter kernel, corresponding to the determined structure of DNN.

According to another embodiment of the disclosure, the AI up-scaler 234 may obtain the DNN setting information for AI up-scaling the second image 135 from among the plurality of pieces of DNN setting information, based on resolution information of the third image 145 included in the AI data.

The AI up-scaler 234 obtains the DNN setting information of the second DNN through the AI data including information related to the first DNN, and performs AI up-scaling on the second image 135 through the second DNN set based on the obtained DNN setting information, and in this case, memory usage and throughput may be reduced compared to when features of the second image 135 are directly analyzed for up-scaling.

According to embodiments of the disclosure, the AI up-scaler 234 may obtain the DNN setting information for performing the AI up-scaling on the second image 135 among the plurality of pieces of DNN setting information, considering any one or any combination of performance information of a display apparatus, a setting value pre-stored in the AI decoding apparatus 200, and a setting value input from a user.

For example, the AI up-scaler 234 may obtain the DNN setting information corresponding to the setting value pre-stored in the AI decoding apparatus 200. For example, when quality and/or resolution are/is pre-stored in the AI decoding apparatus 200, the AI up-scaler 234 may obtain the DNN setting information for generating the third image 145 having the pre-stored quality and/or resolution.

As another example, the AI up-scaler 234 may obtain the DNN setting information corresponding to the setting value input by the user. For example, when quality and/or resolution are/is input by the user, the AI up-scaler 234 may obtain the DNN setting information for generating the third image 145 having the input quality and/or resolution.

As another example, the AI up-scaler 234 may obtain the DNN setting information for generating the third image 145 having quality and/or resolution, considering performance information of the display apparatus that is to reproduce the third image 145 or the post-processed third image 145 (for example, resolution information of an image reproducible by the display apparatus, quality information of an image reproducible by the display apparatus, and the like). For example, when the display apparatus supports only Full HD of 1920×1080 as highest resolution and the resolution of the second image 135 is 1280×720, the AI up-scaler 234 may obtain the DNN setting information for increasing the resolution of the second image 135 by about two times.

According to embodiments, when the second image 135 includes a plurality of frames, the AI up-scaler 234 may independently obtain DNN setting information for a number of frames, or may obtain common DNN setting information for entire frames.

Figure 6:
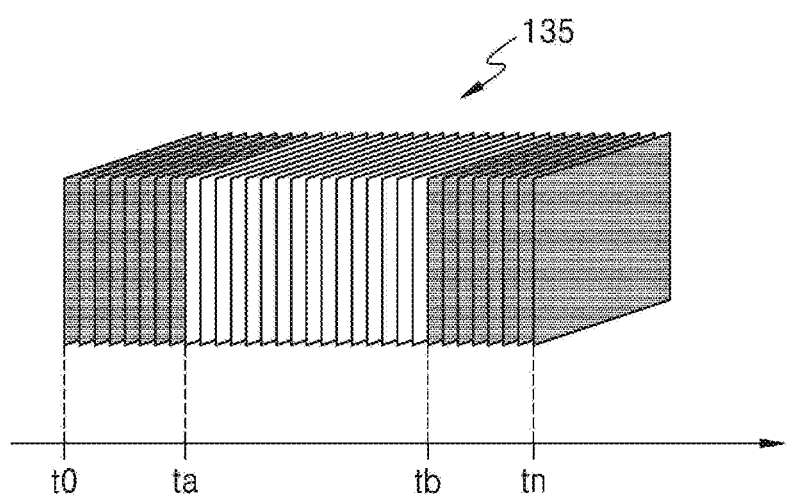
FIG. 6 is a diagram showing a second image including a plurality of frames.

FIG. 6 is a diagram showing the second image 135 including a plurality of frames.

As shown in FIG. 6, the second image 135 may include frames t0 through tn.

According to embodiments, the AI up-scaler 234 may obtain DNN setting information of a second DNN through AI data, and perform AI up-scaling on the frames t0 through tn based on the obtained DNN setting information. In other words, the frames t0 through tn may be processed via AI up-scaling based on common DNN setting information.

According to another embodiment, the AI up-scaler 234 may perform AI up-scaling on some of the frames t0 through tn, for example, the frames t0 through ta, by using 'A' DNN setting information obtained from AI data, and perform AI up-scaling on the frames ta+1 through tb by using 'B' DNN setting information obtained from the AI data. Also, the AI up-scaler 234 may perform AI up-scaling on the frames tb+1 through tn by using 'C' DNN setting information obtained from the AI data. In other words, the AI up-scaler 234 may independently obtain DNN setting information for each group including a number of frames among the plurality of frames, and perform AI up-scaling on frames included in each group by using the independently obtained DNN setting information.

According to another embodiment, the AI up-scaler 234 may independently obtain DNN setting information for each frame forming the second image 135. In other words, when the second image 135 includes three frames, the AI up-scaler 234 may perform AI up-scaling on a first frame by using DNN setting information obtained in relation to the first frame, perform AI up-scaling on a second frame by using DNN setting information obtained in relation to the second frame, and perform AI up-scaling on a third frame by using DNN setting information obtained in relation to the third frame. DNN setting information may be independently obtained for each frame included in the second image 135, according to a method of obtaining DNN setting information based on information (prediction mode information, motion information, quantization parameter information, or the like) provided from the first decoder 232 and information related to the first image 115 included in the AI data, described above. This is because the mode information, the quantization parameter information, or the like may be determined independently for each frame included in the second image 135.

According to another embodiment, the AI data may include information about to which frame DNN setting information obtained based on the AI data is valid. For example, when the AI data includes information indicating that DNN setting information is valid up to the frame ta, the AI up-scaler 234 performs AI up-scaling on the frames t0 through ta by using DNN setting information obtained based on the AI data. Also, when another piece of AI data includes information indicating that DNN setting information is valid up to the frame tn, the AI up-scaler 234 performs AI up-scaling on the frames ta+1 through tn by using DNN setting information obtained based on the other piece of AI data.

According to embodiments of the disclosure, the AI decoding apparatus 200 may store a plurality of second DNNs to obtain different types of third images 145. The plurality of second DNNs may have different structures of layers or different pre-set parameters. The AI up-scaler 234 may select the second DNN for performing the AI up-scaling on the second image 135 from among the plurality of second DNNs, based on information included in either one or both of the image data and the AI data.

The AI up-scaler 234 may select the second DNN for performing the AI up-scaling on the second image 135 from among the plurality of second DNNs, based on any one or any combination of the image data, the AI data, the performance information of the display apparatus, the setting value pre-stored in the AI decoding apparatus 200, and the setting value input from the user. A criterion for selecting the second DNN for performing AI up-scaling on the second image 135 from among the plurality of second DNNs may be the same as that for obtaining DNN setting information for performing the AI up-scaling on the second image 135.

Hereinafter, a structure of the second DNN for performing the AI up-scaling on the second image 135 will be described with reference to FIG. 7, and structures of a plurality of second DNNs corresponding to different up-scaling targets will be described with reference to FIGS. 8 through 11.

Figure 7:
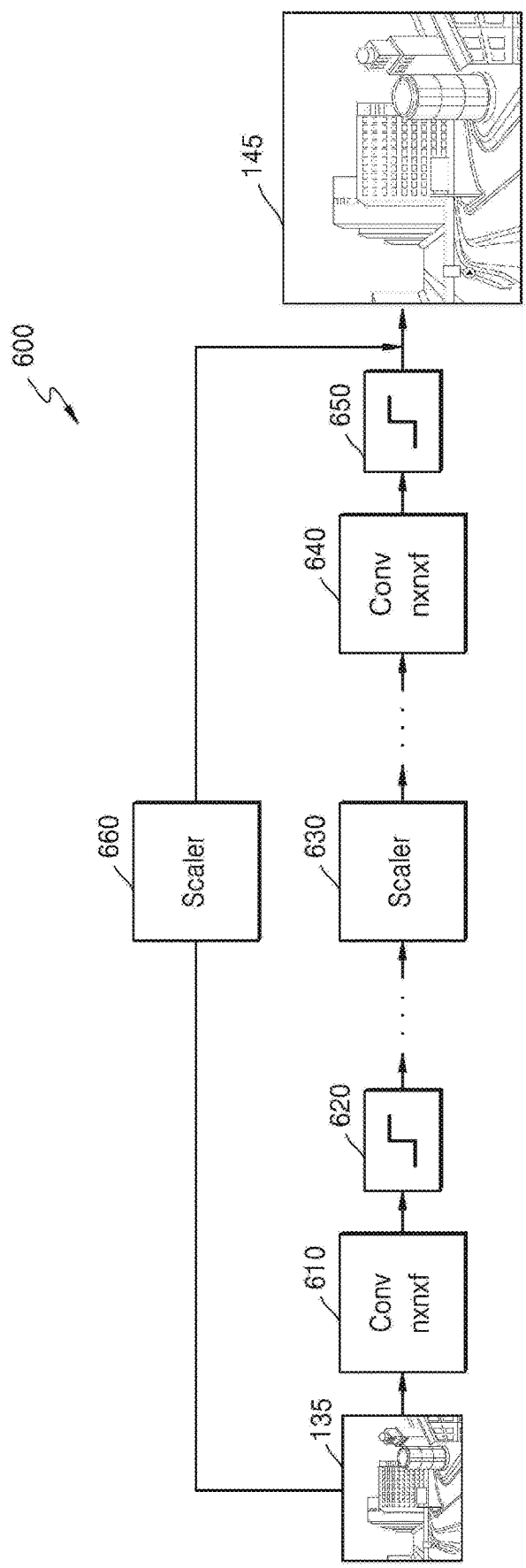
FIG. 7 is a diagram for describing a structure of a second DNN for performing AI up-scaling on a second image, according to embodiments of the disclosure.

FIG. 7 is a diagram for describing a structure of a second DNN 600 for performing AI up-scaling on the second image 135, according to embodiments of the disclosure.

The second DNN 600 may include a plurality of convolution layers, i.e., a first convolution layer 610 and a second convolution layer 640. In each convolution layer, a convolution operation using at least one filter kernel may be performed on an input image.

Referring to FIG. 7, the second image 135 is input to the first convolution layer 610. In the first convolution layer 610, a convolution operation using f filter kernels having a size of n×n is performed. An output of the first convolution layer 610 is input to a first activation layer 620. Also, an output result of a previous layer is input to the second convolution layer 640. In the second convolution layer 640, a convolution operation using f filter kernels having a size of n×n is performed. The first convolution layer 610 and the second convolution layer 640 both use the f filter kernels having the size of n×n, but the size and number of filter kernels used in the first convolution layer 610 may be different from those of filter kernels used in the second convolution layer 640. An output result of the second convolution layer 640 is input to a second activation layer 650.

Also, separately from being input to the first convolution layer 610, the second image 135 may be input to a bypass scaler 660 and an output of the bypass scaler 660 may be added to an output of the second activation layer 650. The third image 145 may be generated in response to a result of adding an output of the bypass scaler 660 and an output of the second activation layer 650.

As shown in FIG. 7, a scaler 630 may be further provided on an input and output line including the first and second convolution layers 610 and 640 and the first and second activation layers 620 and 650. There may be one or more scalers 630, and the scaler 630 may be positioned before or after any one convolution layer or before or after any one activation layer. The scaler 630 and the bypass scaler 660 may increase resolution of an input image, and for example, may include any one or any combination of a bilinear scaler, a bicubic scaler, a lanczos scaler, and a stair step scaler. According to embodiments of the disclosure, either one or both of the scaler 630 and the bypass scaler 660 may be replaced by a convolution layer for increasing a size of input data.

The second DNN 600 shown in FIG. 7 may generate a prediction version third image through the bypass scaler 660, generate a residual version third image through the input and output line including the first and second convolution layers 610 and 640, and generate the third image 145 by adding the prediction version third image and the residual version third image. Because the bypass scaler 660 outputs the prediction version third image, the number of layers of the second DNN 600 may be reduced, and accordingly, less time is consumed to train parameters and an operation time during actual driving is reduced.

Figure 8:
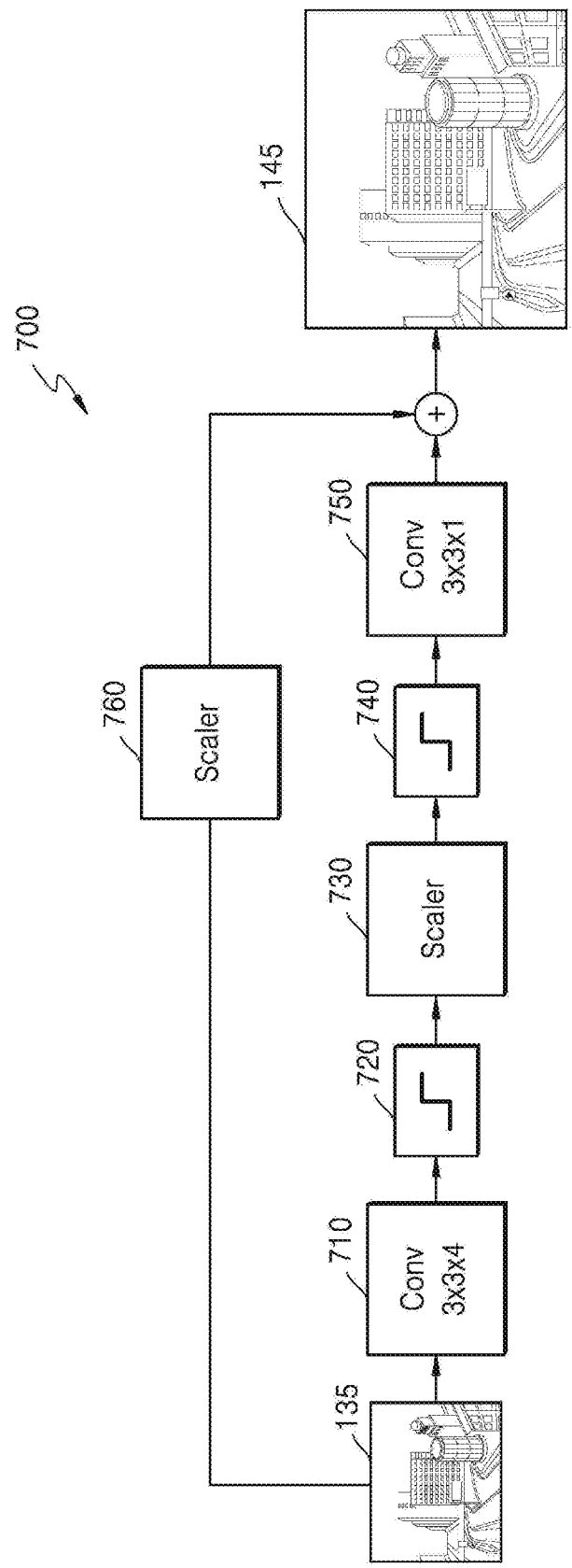
FIG. 8 is a diagram for describing a structure of a second DNN for performing AI up-scaling on a second image corresponding to a first up-scaling target.
Figure 9:
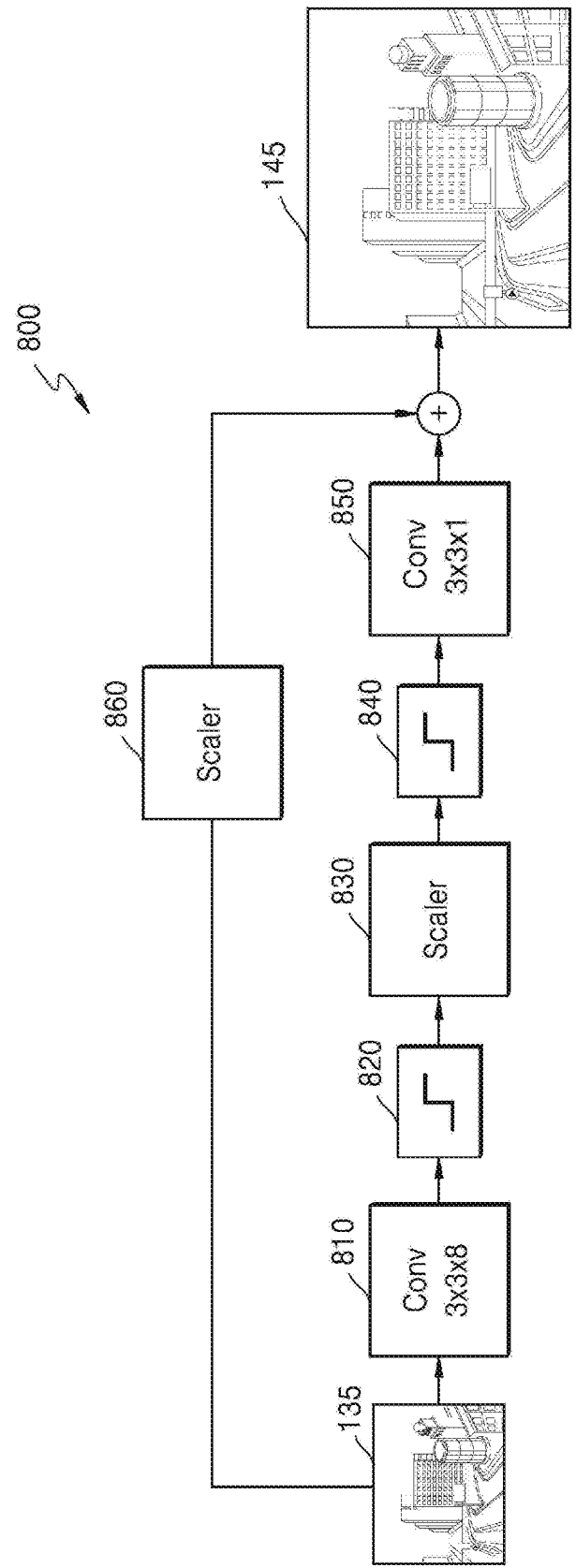
FIG. 9 is a diagram for describing a structure of a second DNN for performing AI up-scaling on a second image corresponding to a second up-scaling target.
Figure 10:
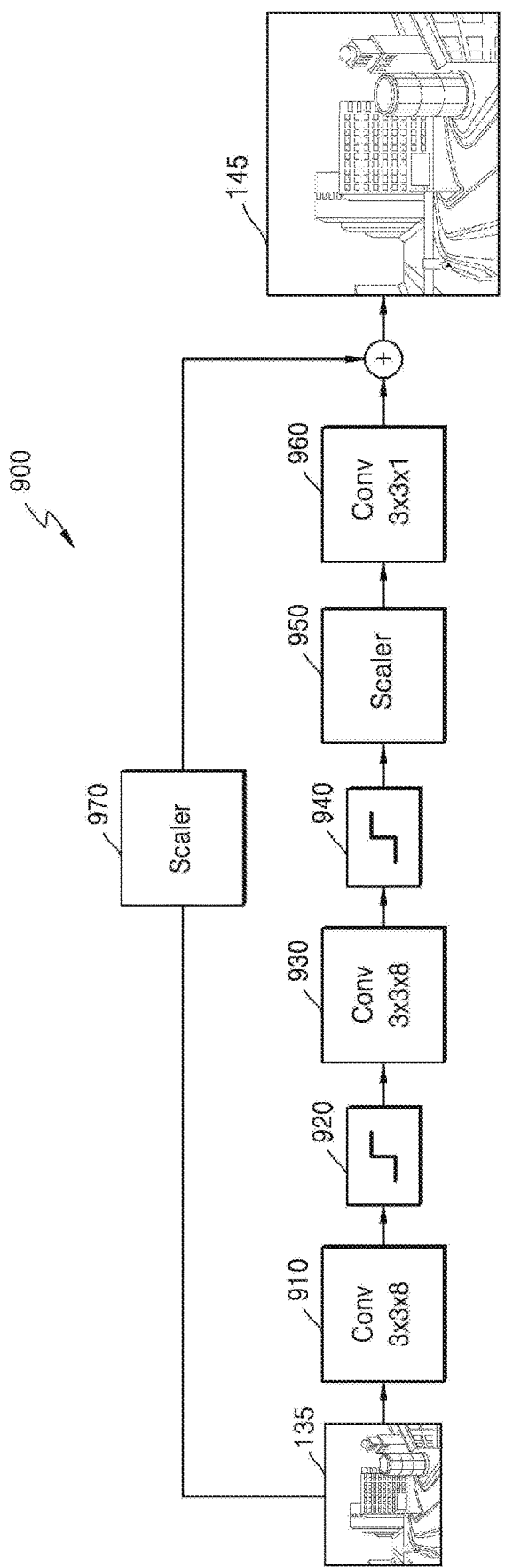
FIG. 10 is a diagram for describing a structure of a second DNN for performing AI up-scaling on a second image corresponding to a third up-scaling target.
Figure 11:
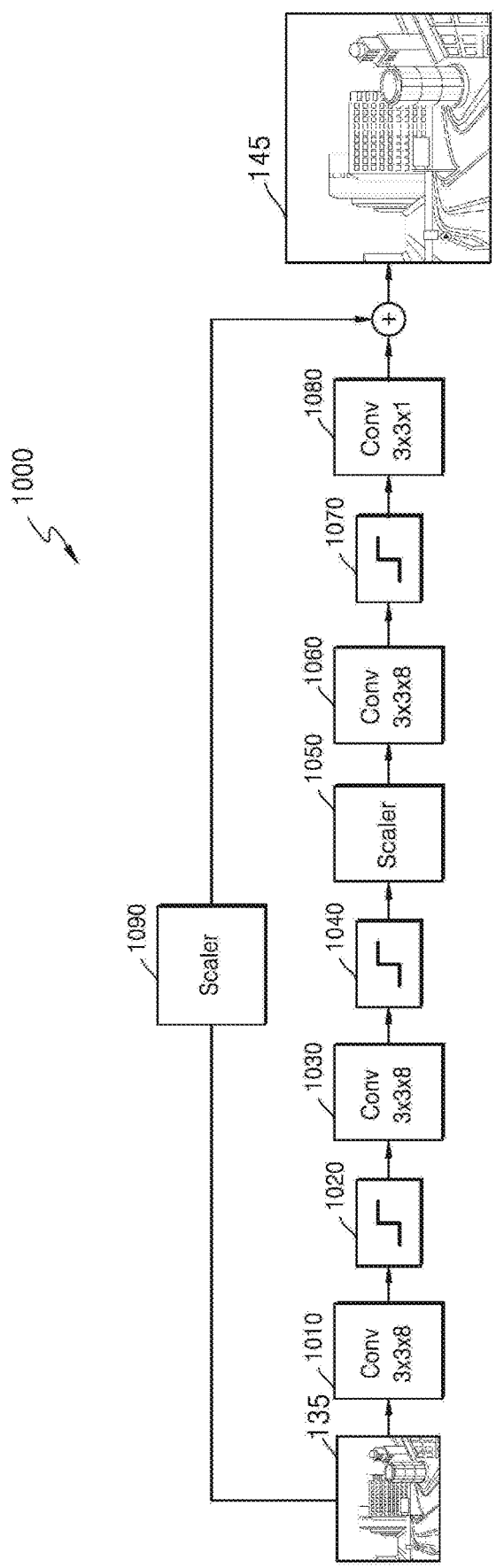
FIG. 11 is a diagram for describing a structure of a second DNN for performing AI up-scaling on a second image corresponding to a fourth up-scaling target.

FIG. 8 is a diagram for describing a structure of a second DNN 700 for performing AI up-scaling on the second image 135 corresponding to a first up-scaling target, and FIG. 9 is a diagram for describing a structure of a second DNN 800 for performing AI up-scaling on the second image 135 corresponding to a second up-scaling target. Also, FIG. 10 is a diagram for describing a structure of a second DNN 900 for performing AI up-scaling on the second image 135 corresponding to a third up-scaling target, and FIG. 11 is a diagram for describing a structure of a second DNN 1000 for performing AI up-scaling on the second image 135 corresponding to a fourth up-scaling target.

According to embodiments of the disclosure, resolution of the third image 145 generated according to the first up-scaling target may be lower than resolution of the third image 145 generated according to the second up-scaling target. Also, the resolution of the third image 145 generated according to the second up-scaling target may be lower than resolution of the third image 145 generated according to the third up-scaling target. In addition, the resolution of the third image 145 generated according to the third up-scaling target may be lower than resolution of the third image 145 generated according to the fourth up-scaling target.

As described above, when an up-scaling target is determined, the AI up-scaler 234 may input the second image 135 to a second DNN corresponding to the determined up-scaling target among a plurality of second DNNs.

When the up-scaling target is determined based on AI data or the like, the AI up-scaler 234 may generate the third image 145 through a second DNN corresponding to the up-scaling target from among the second DNNs 700 through 1000 of FIGS. 8 through 11.

First, referring to FIG. 8, the second image 135 is input to a first convolution layer 710. The first convolution layer 710 performs a convolution operation on the second image 135 by using 4 filter kernels having a size of 3×3. An output of the first convolution layer 710 is input to a first activation layer 720, an output of the first activation layer 720 is input to a scaler 730, and an output of the scaler 730 is input to a second activation layer 740. An output of the second activation layer 740 is input to a second convolution layer 750. The second convolution layer 750 performs a convolution operation on input data by using one filter kernel having a size of 3×3.

Also, the second image 135 is input to a bypass scaler 760, and the third image 145 is generated as an output of the bypass scaler 760 and an output of the second convolution layer 750 are added.

Then, referring to FIG. 9, the second image 135 is input to a first convolution layer 810. The first convolution layer 810 performs a convolution operation on input data by using 8 filter kernels having a size of 3×3. An output of the first convolution layer 810 is input to a first activation layer 820 and an output of the first activation layer 820 is input to a scaler 830. Also, an output of the scaler 830 is input to a second activation layer 840 and an output of the second activation layer 840 is input to a second convolution layer 850. The second convolution layer 850 performs a convolution operation on input data by using one filter kernel having a size of 3×3. Also, the second image 135 is input to a bypass scaler 860, and the third image 145 is generated as an output of the bypass scaler 860 and an output of the second convolution layer 850 are added.

Referring to FIG. 10, the second image 135 is input to a first convolution layer 910. The first convolution layer 910 performs a convolution operation on input data by using 8 filter kernels having a size of 3×3. An output of the first convolution layer 910 is input to a first activation layer 920 and an output of the first activation layer 920 is input to a second convolution layer 930. The second convolution layer 930 performs a convolution operation on input data by using 8 filter kernels having a size of 3×3. An output of the second convolution layer 930 is input to a second activation layer 940 and an output of the second activation layer 940 is input to a scaler 950. Then, an output of the scaler 950 is input to a third convolution layer 960. The third convolution layer 960 performs a convolution operation on input data by using one filter kernel having a size of 3×3. Also, the second image 135 is input to a bypass scaler 970, and the third image 145 is generated as an output of the bypass scaler 970 and an output of the third convolution layer 960 are added.

Then, referring to FIG. 11, the second image 135 is input to a first convolution layer 1010. The first convolution layer 1010 performs a convolution operation on input data by using 8 filter kernels having a size of 3×3. An output of the first convolution layer 1010 is input to a first activation layer 1020 and an output of the first activation layer 1020 is input to a second convolution layer 1030. The second convolution layer 1030 performs a convolution operation on input data by using 8 filter kernels having a size of 3×3. An output of the second convolution layer 1030 is input to a second activation layer 1040 and an output of the second activation layer 1040 is input to a scaler 1050. Then, an output of the scaler 1050 is input to a third convolution layer 1060. The third convolution layer 1060 performs a convolution operation on input data by using 8 filter kernels having a size of 3×3. An output of the third convolution layer 1060 is input to a third activation layer 1070 and an output of the third activation layer 1070 is input to a fourth convolution layer 1080. The fourth convolution layer 1080 performs a convolution operation on input data by using one filter kernel having a size of 3×3. Also, the third image 145 is generated as an output of the bypass scaler 1090 that received the second image 135 and an output of the fourth convolution layer 1080 are added.

Each of the second DNNs 700 through 1000 shown in FIGS. 8 through 11 may be stored in the AI decoding apparatus 200 for different up-scaling targets. As shown in FIGS. 8 through 11, the plurality of second DNNs 700 through 1000 may have different layer structures or may have different sizes, numbers, or the like of the filter kernels even when the layer structures are the same. The AI decoding apparatus 200 may determine a second DNN for performing AI up-scaling on the second image 135, based on AI data or the like.

A plurality of second DNNs may be jointly trained respectively with a plurality of first DNNs for AI down-scaling. For example, when the number of first DNNs for AI down-scaling is 4 and the number of second DNNs for AI up-scaling is 4, the 4 first DNNs and the 4 second DNNs may be jointly trained in a 1:1 manner.

Figure 12:
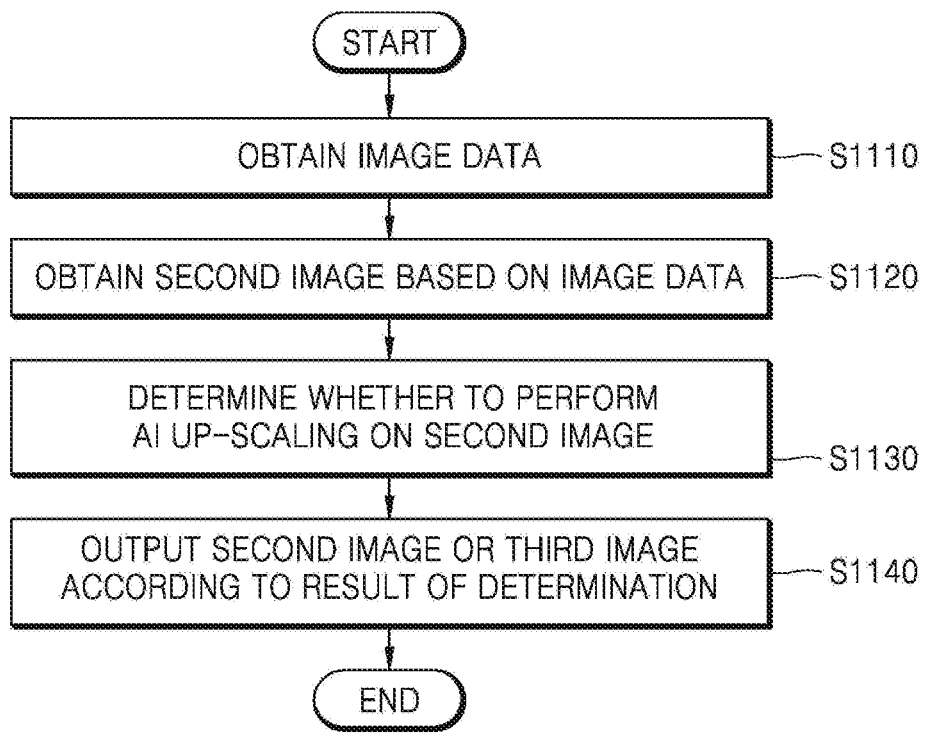
FIG. 12 is a flowchart of an AI decoding method according to embodiments of the disclosure.

FIG. 12 is a flowchart of an AI decoding method according to embodiments of the disclosure.

In operation S1110, the AI decoding apparatus 200 obtains image data obtained as a result of performing the first encoding 120 on the first image 115. The AI decoding apparatus 200 may further obtain AI data related to AI down-scaling.

The image data may be received in a form of a bitstream. The image data may include data generated based on pixel values in the first image 115, for example, residual data that is a difference between the first image 115 and prediction data of the first image 115. Also, the image data includes information used during the first encoding 120 performed on the first image 115. For example, the image data may include prediction mode information, motion information, information related to quantization parameter or the like used during the first encoding 120. The image data may be generated according to a rule for example, according to a syntax of an image compression method used during the first encoding 120, among MPEG-2, H.264 AVC, MPEG-4, HEVC, VC-1, VP8, VP9, and AV1.

The AI data includes information indicating whether the first image 115 is generated via AI down-scaling.

The AI data includes information enabling AI up-scaling to be performed on the second image 135 to an up-scaling target corresponding to a down-scaling target of a first DNN.

For example, the information included in the AI data may include difference information between the original image 105 and the first image 115. The difference information may include information about a resolution conversion degree of the first image 115 compared to the original image 105 (for example, resolution conversion rate information). Also, because the resolution of the first image 115 is verified through the resolution of the reconstructed second image 135, the difference information may be expressed only as resolution information of the original image 105.

For example, the AI data may include information related to the first image 115. The information related to the first image 115 may include information about any one or any combination of resolution of the first image 115, a bitrate of the image data generated as the result of performing the first encoding 120 on the first image 115, and a codec type used during the first encoding 120 of the first image 115.

For example, the AI data may include resolution information of the third image 145 to be generated through AI up-scaling.

Also, for example, the AI data may further include encoding parameter information as reference information to be input to the second DNN for AI up-scaling of the second image 135. The encoding parameter information indicates an encoding parameter that may be generated during the first encoding 120 of the original image 105 or the first image 115.

The AI data may be received in a form of a bitstream. Alternatively, according to embodiments of the disclosure, the AI data may be received in a form of a frame or a packet.

The image data and the AI data may be transmitted to the AI decoding apparatus 200 through the same network or different networks.

In operation S1120, the AI decoding apparatus 200 obtains the second image 135 based on the image data. The AI decoding apparatus 200 reconstructs the second image 135 corresponding to the first image 115 by decoding the image data based on an image reconstruction method using frequency transform.

In operation S1130, the AI decoding apparatus 200 determines whether to perform AI up-scaling on the second image 135.

When the AI data is not obtained, the AI decoding apparatus 200 may determine not to perform AI up-scaling on the second image 135.

When the AI data is obtained and the obtained AI data includes information that the first image 115 is generated through AI down-scaling, the AI decoding apparatus 200 may determine to perform AI up-scaling on the second image 135, and when the AI data includes information that the first image 115 is not generated through AI down-scaling, the AI decoding apparatus 200 may determine not to perform AI up-scaling on the second image 135.

According to embodiments of the disclosure, even when the AI data includes the information that the first image 115 is generated through AI down-scaling, the AI decoding apparatus 200 may determine not to perform AI up-scaling on the second image 135 when the second DNN is not available.

When it is determined to perform AI up-scaling on the second image 135, the AI decoding apparatus 200 obtains the third image 145 by performing the AI up-scaling on the second image 135 through the second DNN, in operation S1140. Then, when the third image 145 is obtained, the AI decoding apparatus 200 outputs the third image 145, and when it is determined not to perform AI up-scaling on the second image 135, the AI decoding apparatus 200 outputs the second image 135. According to embodiments of the disclosure, a display apparatus may perform up-scaling on the second image 135 output from the AI decoding apparatus 200.

According to embodiments of the disclosure, when the AI data includes the information that the first image 115 is generated through AI down-scaling but AI up-scaling is not performed on the second image 135 because the second DNN is not available, the AI decoding apparatus 200 may output the second image 135 after performing legacy up-scaling on the second image 135.

Hereinafter, the AI encoding apparatus 1200 for performing AI encoding on the original image 105 will be described with reference to FIG. 13.

FIG. 13 is a block diagram of a configuration of the AI encoding apparatus 1200 according to embodiments.

Referring to FIG. 13, the AI encoding apparatus 1200 may include an AI encoder 1210 and a transmitter 1230. The AI encoder 1210 may include an AI down-scaler 1212 and a first encoder 1214. The transmitter 1230 may include a data processor 1232 and a communicator 1234.

In FIG. 13, the AI encoder 1210 and the transmitter 1230 are illustrated as separate devices, but the AI encoder 1210 and the transmitter 1230 may be implemented through one processor. In this case, the AI encoder 1210 and the transmitter 1230 may be implemented through an dedicated processor or through a combination of software and general-purpose processor such as AP, CPU or graphics processing unit GPU. The dedicated processor may be implemented by including a memory for implementing embodiments of the disclosure or by including a memory processor for using an external memory.

Also, the AI encoder 1210 and the transmitter 1230 may be configured by a plurality of processors. In this case, the AI encoder 1210 and the transmitter 1230 may be implemented through a combination of dedicated processors or through a combination of software and a plurality of general-purpose processors such as AP, CPU or GPU. The AI down-scaler 1212 and the first encoder 1214 may be implemented through different processors.

The AI encoder 1210 performs AI down-scaling on the original image 105 and first encoding on the first image 115, and transmits AI data and image data to the transmitter 1230. The transmitter 1230 transmits the AI data and the image data to the AI decoding apparatus 200.

The image data includes data obtained as a result of performing the first encoding on the first image 115. The image data may include data obtained based on pixel values in the first image 115, for example, residual data that is a difference between the first image 115 and prediction data of the first image 115. Also, the image data includes information used during a first encoding process of the first image 115. For example, the image data may include prediction mode information, motion information, quantization parameter information used to perform the first encoding on the first image 115, and the like.

The AI data includes information enabling AI up-scaling to be performed on the second image 135 to an up-scaling target corresponding to a down-scaling target of a first DNN. According to embodiments, the AI data may include difference information between the original image 105 and the first image 115. Also, the AI data may include information related to the first image 115. The information related to the first image 115 may include information about any one or any combination of resolution of the first image 115, a bitrate of the image data obtained as the result of performing the first encoding on the first image 115, and a codec type used during the first encoding of the first image 115.

According to embodiments, the AI data may include an identifier of mutually agreed DNN setting information such that the AI up-scaling is performed on the second image 135 to the up-scaling target corresponding to the down-scaling target of the first DNN.

Also, according to embodiments, the AI data may include DNN setting information settable in a second DNN.

Also, the AI data may include information indicating whether an image on which first encoding is to be performed is an image on which AI down-scaling is performed. Also, the AI data may include resolution information of the third image 145 to be generated through AI up-scaling. In addition, the AI data may further include reference information to be input to the second DNN for AI up-scaling of the second image 135.

The AI down-scaler 1212 determines whether to perform AI down-scaling on the original image 105 through the first DNN. The AI down-scaler 1212 may determine whether to perform the AI down-scaling, based on resolution of the original image 105, a type (for example, a file type) of the original image 105, a type of an object included in the original image 105, and the like. For example, the AI down-scaler 1212 may determine not to perform the AI down-scaling when the resolution of the original image 105 is lower than a resolution (for example, high definition (HD)).

According to embodiments of the disclosure, when the first DNN is available, the AI down-scaler 1212 may determine to perform AI down-scaling on the original image 105, and when the first DNN is not available, the AI down-scaler 1212 may determine not to perform AI down-scaling on the original image 105.

Here, a case in which the first DNN is not available may include a case in which the first DNN is not stored in the AI down-scaler 1212, and a case in which, even when the first DNN is stored in the AI down-scaler 1212, DNN setting information for performing the AI down-scaling on the original image 105 is not stored.

Also, the case in which the first DNN is not available may also include a case in which a version of the first DNN and/or DNN setting information stored in the AI down-scaler 1212 is not the latest version. According to embodiments of the disclosure, the AI encoding apparatus 1200 may receive and store the first DNN and the DNN setting information from an external server through a network, and when either one or both of the first DNN and the DNN setting information stored in the AI encoding apparatus 1200 is not the latest version, the AI down-scaler 1212 may determine that the first DNN is not available.

When it is determined to perform AI down-scaling on the original image 105 through the first DNN, the AI down-scaler 1212 may obtain the first image 115 by performing the AI down-scaling on the original image 105 through the first DNN. The AI down-scaler 1212 may further input reference information to the first DNN together with the original image 105 to perform the AI down-scaling on the original image 105. The reference information may be input to the first DNN for effective AI down-scaling of the original image 105. The reference information may include, for example, position information of pixels included in the original image 105. The position information of the pixels included in the original image 105 may include a position map of the original image 105, and each of pixels of the position map may have a value corresponding to a position of each pixel in the original image 105.

The AI down-scaler 1212 may determine the down-scaling target of the original image 105, based on a pre-determined standard.

To obtain the first image 115 matching the down-scaling target, the AI down-scaler 1212 may store a plurality of pieces of DNN setting information settable in the first DNN. The AI down-scaler 1212 obtains DNN setting information corresponding to the down-scaling target from among the plurality of pieces of DNN setting information, and performs the AI down-scaling on the original image 105 through the first DNN set in the obtained DNN setting information.

Each of the plurality of pieces of DNN setting information may be trained to obtain the first image 115 of pre-determined resolution and/or pre-determined quality. For example, any one piece of DNN setting information among the plurality of pieces of DNN setting information may include information for obtaining the first image 115 of resolution half resolution of the original image 105, for example, the first image 115 of 2 K (2048×1080) half 4 K (4096×2160) of the original image 105, and another piece of DNN setting information may include information for obtaining the first image 115 of resolution quarter resolution of the original image 105, for example, the first image 115 of 2 K (2048×1080) quarter 8 K (8192×4320) of the original image 105.

According to embodiments, when pieces of information (for example, the number of convolution layers, the number of filter kernels for each convolution layer, a parameter of each filter kernel, and the like) constituting the DNN setting information are stored in a form of a lookup table, the AI down-scaler 1212 may obtain the DNN setting information by combining some values selected from values in the lookup table, based on the down-scaling target, and perform AI down-scaling on the original image 105 by using the obtained DNN setting information.

According to embodiments, the AI down-scaler 1212 may determine a structure of DNN corresponding to the down-scaling target, and obtain DNN setting information corresponding to the determined structure of DNN, for example, obtain parameters of a filter kernel.

The plurality of pieces of DNN setting information for performing the AI down-scaling on the original image 105 may have an optimized value as the first DNN and the second DNN are jointly trained. Here, each piece of DNN setting information includes any one or any combination of the number of convolution layers included in the first DNN, the number of filter kernels for each convolution layer, and a parameter of each filter kernel.

The AI down-scaler 1212 may set the first DNN with the DNN setting information obtained for performing the AI down-scaling on the original image 105 to obtain the first image 115 of a resolution and/or a quality through the first DNN. When the DNN setting information for performing the AI down-scaling on the original image 105 is obtained from the plurality of pieces of DNN setting information, each layer in the first DNN may process input data based on information included in the DNN setting information.

According to embodiments of the disclosure, to generate the first image 115 matching the down-scaling target, the AI down-scaler 1212 may determine a first DNN for performing the AI down-scaling on the original image 105 from among a plurality of pre-stored first DNNs, and perform the AI down-scaling on the original image 105 through the determined first DNN. The plurality of first DNNs may have different structures of layers or different pre-set parameters.

The AI down-scaler 1212 may select the first DNN for performing the AI down-scaling on the original image 105 from among the plurality of first DNNs, based on a predetermined criterion (for example, a criterion determined based on any one or any combination of a compression ratio, compression quality, compression history information, and a type of the original image 105). As described above with reference to FIGS. 8 through 11, the plurality of first DNNs may include a common bypass scaler, but may have different layer structures of input and output lines including a plurality of convolution layers.

Hereinafter, a method, performed by the AI down-scaler 1212, of determining the down-scaling target will be described. The down-scaling target may indicate, for example, by how much is resolution decreased from the original image 105 to obtain the first image 115.

According to embodiments, the AI down-scaler 1212 may determine the down-scaling target based on any one or any combination of a compression ratio (for example, a resolution difference between the original image 105 and the first image 115, target bitrate, or the like), compression quality (for example, type of bitrate), compression history information, and a type of the original image 105.

For example, the AI down-scaler 1212 may determine the down-scaling target based on the compression ratio, the compression quality, or the like, which is pre-set or input from a user.

As another example, the AI down-scaler 1212 may determine the down-scaling target by using the compression history information stored in the AI encoding apparatus 1200. For example, according to the compression history information usable by the AI encoding apparatus 1200, encoding quality, a compression ratio, or the like preferred by the user may be determined, and the down-scaling target may be determined according to the encoding quality determined based on the compression history information. For example, the resolution, quality, or the like of the first image 115 may be determined according to the encoding quality that has been used most often according to the compression history information.

As another example, the AI down-scaler 1212 may determine the down-scaling target based on the encoding quality that has been used more frequently than a threshold value (for example, average quality of the encoding quality that has been used more frequently than the threshold value), according to the compression history information.

As another example, the AI down-scaler 1212 may determine the down-scaling target, based on the resolution, type (for example, a file format), or the like of the original image 105.

According to embodiments, when the original image 105 includes a plurality of frames, the AI down-scaler 1212 may independently determine down-scaling target for a number of frames, or may determine down-scaling target for entire frames.

According to embodiments, the AI down-scaler 1212 may divide the frames included in the original image 105 into a number of groups, and independently determine the down-scaling target for each group. The same or different down-scaling targets may be determined for each group. The number of frames included in the groups may be the same or different according to the each group.

According to another embodiment, the AI down-scaler 1212 may independently determine a down-scaling target for each frame included in the original image 105. The same or different down-scaling targets may be determined for each frame.

Hereinafter, an example of a structure of a first DNN 1300 on which AI down-scaling is based will be described.

Figure 14:
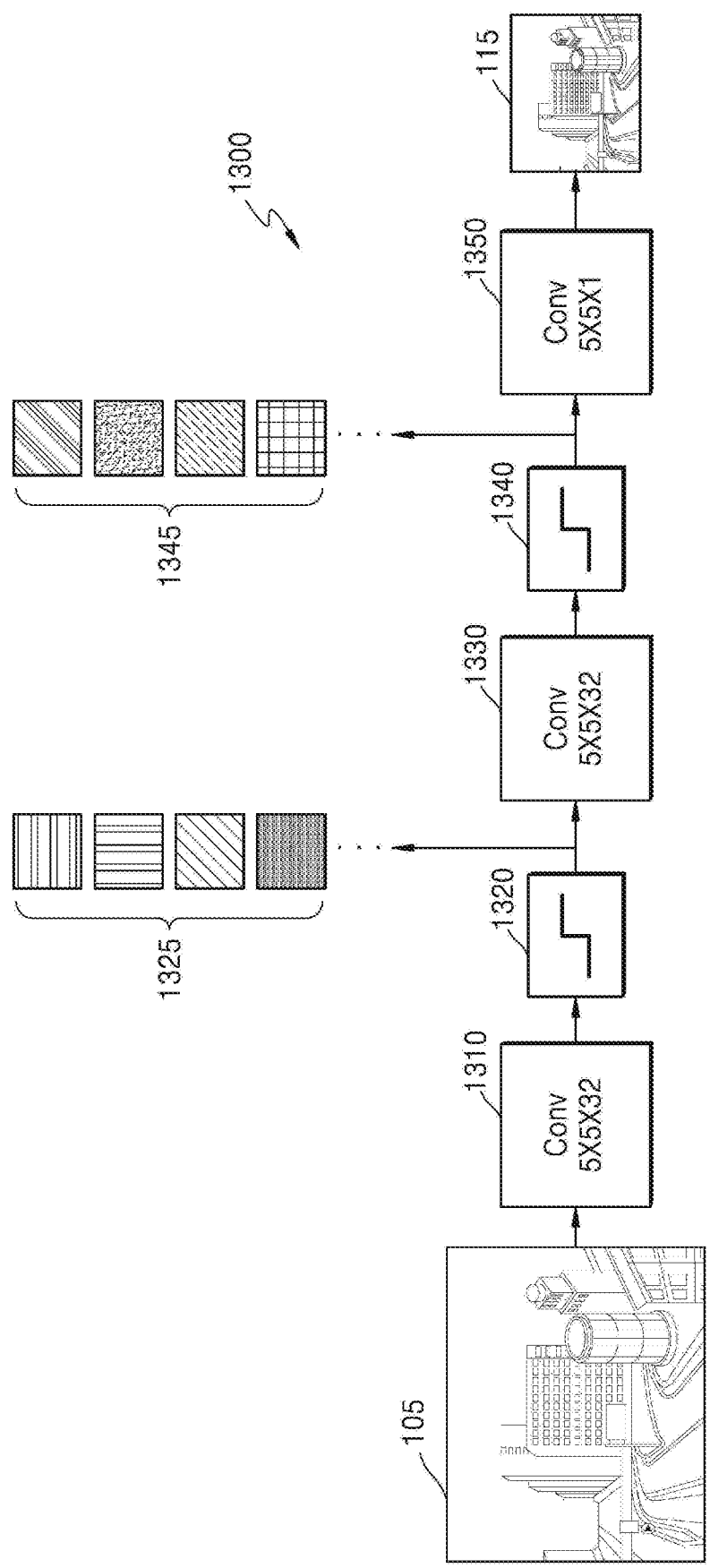
FIG. 14 is a diagram showing a first DNN for performing AI down-scaling on an original image.

FIG. 14 is a diagram showing the first DNN 1300 for performing AI down-scaling on the original image 105.

As shown in FIG. 14, the original image 105 is input to a first convolution layer 1310. The first convolution layer 1310 performs a convolution process on the original image 105 by using 32 filter kernels having a size of 5×5. 32 feature maps generated as a result of the convolution process are input to a first activation layer 1320. The first activation layer 1320 may assign a non-linear feature to the 32 feature maps.

The first activation layer 1320 determines whether to transmit sample values of the feature maps output from the first convolution layer 1310 to a second convolution layer 1330. For example, some of the sample values of the feature maps are activated by the first activation layer 1320 and transmitted to the second convolution layer 1330, and some of the sample values are deactivated by the first activation layer 1320 and not transmitted to the second convolution layer 1330. Information represented by the feature maps output from the first convolution layer 1310 is emphasized by the first activation layer 1320.

An output 1325 of the first activation layer 1320 is input to a second convolution layer 1330. The second convolution layer 1330 performs a convolution process on input data by using 32 filter kernels having a size of 5×5. 32 feature maps output as a result of the convolution process are input to a second activation layer 1340, and the second activation layer 1340 may assign a non-linear feature to the 32 feature maps.

An output 1345 of the second activation layer 1340 is input to a third convolution layer 1350. The third convolution layer 1350 performs a convolution process on input data by using one filter kernel having a size of 5×5. As a result of the convolution process, one image may be output from the third convolution layer 1350. The third convolution layer 1350 generates one output by using the one filter kernel as a layer for outputting a final image. According to embodiments of the disclosure, the third convolution layer 1350 may output the first image 115 as a result of a convolution operation.

There may be a plurality of pieces of DNN setting information indicating the numbers of filter kernels of the first, second, and third convolution layers 1310, 1330, and 1350 of the first DNN 1300, a parameter of each filter kernel of the first, second, and third convolution layers 1310, 1330, and 1350 of the first DNN 1300, and the like, and the plurality of pieces of DNN setting information may be connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

In FIG. 14, the first DNN 1300 includes three convolution layers (the first, second, and third convolution layers 1310, 1330, and 1350) and two activation layers (the first and second activation layers 1320 and 1340), but this is only an example, and the numbers of convolution layers and activation layers may vary according to embodiments. Also, according to embodiments, the first DNN 1300 may be implemented as an RNN. In this case, a CNN structure of the first DNN 1300 according to embodiments of the disclosure is changed to an RNN structure.

According to embodiments, the AI down-scaler 1212 may include at least one ALU for the convolution operation and the operation of the activation layer described above. The ALU may be implemented as a processor. For the convolution operation, the ALU may include a multiplier that performs multiplication between sample values of the original image 105 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result and a value to determine whether to transmit the input sample value to a next layer.

Referring back to FIG. 13, upon receiving the first image 115 from the AI down-scaler 1212, the first encoder 1214 may reduce an information amount of the first image 115 by performing first encoding on the first image 115. The image data corresponding to the first image 115 may be obtained as a result of performing the first encoding by the first encoder 1214.

The data processor 1232 processes either one or both of the AI data and the image data to be transmitted in a form. For example, when the AI data and the image data are to be transmitted in a form of a bitstream, the data processor 1232 may process the AI data to be expressed in a form of a bitstream, and transmit the image data and the AI data in a form of one bitstream through the communicator 1234. As another example, the data processor 1232 may process the AI data to be expressed in a form of bitstream, and transmit each of a bitstream corresponding to the AI data and a bitstream corresponding to the image data through the communicator 1234. As another example, the data processor 1232 may process the AI data to be expressed in a form of a frame or packet, and transmit the image data in a form of a bitstream and the AI data in a form of a frame or packet through the communicator 1234.

The communicator 1234 transmits AI encoding data obtained as a result of performing AI encoding, through a network. The AI encoding data obtained as the result of performing AI encoding includes the image data and the AI data. The image data and the AI data may be transmitted through a same type of network or different types of networks.

According to embodiments, the AI encoding data obtained as a result of processes of the data processor 1232 may be stored in a data storage medium including a magnetic medium such as a hard disk, a floppy disk, or a magnetic tape, an optical recording medium such as CD-ROM or DVD, or a magneto-optical medium such as a floptical disk.

Hereinafter, another structure of a first DNN for performing AI down-scaling on the original image 105 will be described.

Figure 15:
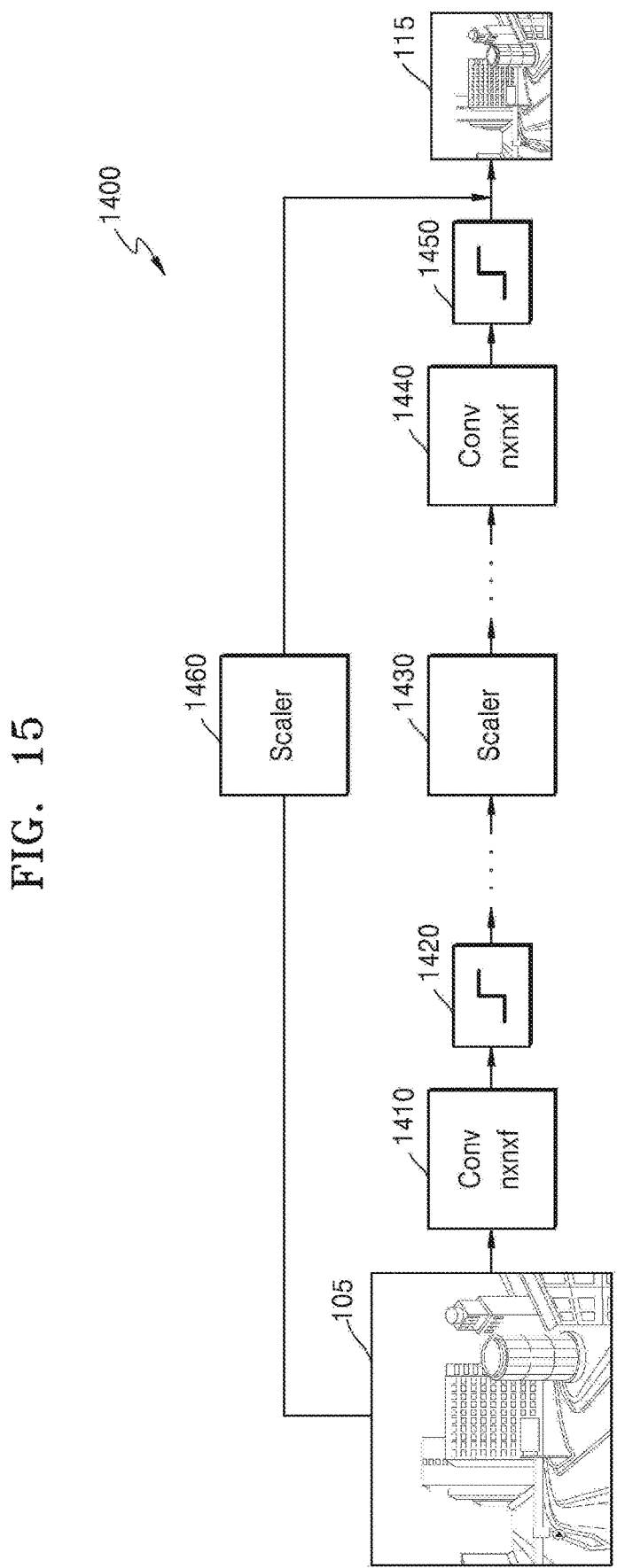
FIG. 15 is a diagram showing a structure of a first DNN for performing AI down-scaling on an original image, according to embodiments of the disclosure.

FIG. 15 is a diagram showing a structure of a first DNN 1400 for performing AI down-scaling, according to embodiments of the disclosure.

Referring to FIG. 15, the first DNN 1400 may include a plurality of convolution layers, i.e., first and second convolution layers 1410 and 1440. In each convolution layer, a convolution operation using at least one filter kernel may be performed on an input image.

The first DNN 1400 may further include at least one activation layer, i.e., first and second activation layers 1420 and 1450. Each activation layer may assign a non-linear feature to an output result of a previous layer.

Referring to FIG. 15, the original image 105 is input to the first convolution layer 1410. In the first convolution layer 1410, a convolution operation using f filter kernels having a size of n×n is performed. An output of the first convolution layer 1410 is input to the first activation layer 1420. Also, an output result of a previous layer is input to the second convolution layer 1440. In the second convolution layer 1440, a convolution operation using f filter kernels having a size of n×n is performed. The first convolution layer 1410 and the second convolution layer 1440 both use the f filter kernels having the size of n×n, but the size and number of filter kernels used in the first convolution layer 1410 may be different from those of filter kernels used in the second convolution layer 1440. An output of the second convolution layer 1440 is input to the second activation layer 1450.

Also, separately from being input to the first convolution layer 1410, the original image 105 may be input to a bypass scaler 1460 and an output of the bypass scaler 1460 may be added to an output of the second activation layer 1450. The first image 115 may be generated in response to a result of adding an output of the bypass scaler 1460 and an output of the second activation layer 1450.

As shown in FIG. 15, a scaler 1430 may be further provided on an input and output line including the first and second convolution layers 1410 and 1440 and the first and second activation layers 1420 and 1450. There may be one or more scalers 1430, and the scaler 1430 may be positioned before or after any one convolution layer or before or after any one activation layer. The scaler 1430 and the bypass scaler 1460 may reduce resolution of an input image, and for example, may include any one or any combination of a bilinear scaler, a bicubic scaler, a lanczos scaler, and a stair step scaler. According to embodiments of the disclosure, either one or both of the scaler 1430 and the bypass scaler 1460 may be replaced by a convolution layer for increasing a size of input data.

The first DNN 1400 shown in FIG. 15 may generate a prediction version first image through the bypass scaler 1460, generate a residual version first image through the input and output line including the first and second convolution layers 1410 and 1440, and generate the first image 115 by adding the prediction version third image and the residual version third image. Because the bypass scaler 1460 outputs the prediction version first image, the number of layers of the first DNN 1400 may be reduced, and accordingly, less time is consumed to train parameters and an operation time during actual driving is reduced.

Figure 16:
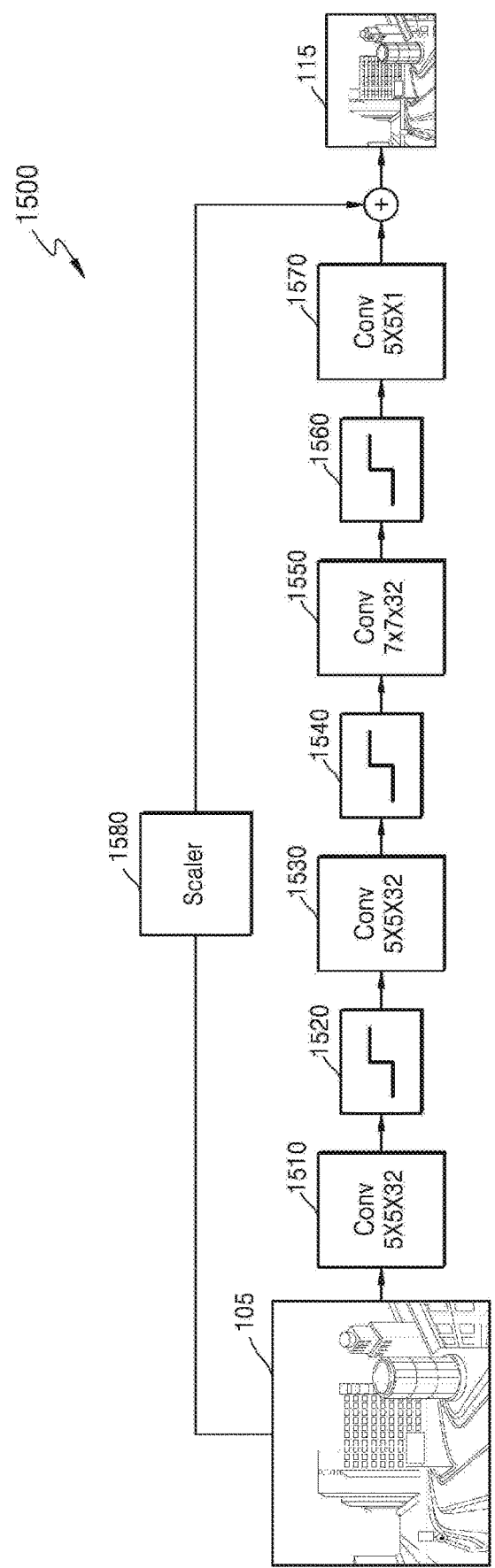
FIG. 16 is a diagram showing a structure of a first DNN for performing AI down-scaling on an original image, according to embodiments of the disclosure.

FIG. 16 is a diagram showing a structure of a first DNN 1500 for performing AI down-scaling, according to another embodiment of the disclosure.

Referring to FIG. 16, the original image 105 is input to a first convolution layer 1510 and an output of the first convolution layer 1510 is input to a first activation layer 1520. An output of the first activation layer 1520 is input to a second convolution layer 1530 and an output of the second convolution layer 1530 is input to a second activation layer 1540. Also, an output of the second activation layer 1540 is input to a third convolution layer 1550 and an output of the third convolution layer 1550 is input to a third activation layer 1560. An output of the third activation layer 1560 is input to a fourth convolution layer 1570. Also, a result output from a bypass scaler 1580 that received the original image 105 may be added to an output of the fourth convolution layer 1570. In FIG. 16, the first convolution layer 1510 may perform the convolution operation on the input data by using 32 filter kernels having a size of 5×5, and the second convolution layer 1530 may perform the convolution operation on the input data by using 32 filter kernels having a size of 5×5. Also, the third convolution layer 1550 may perform the convolution operation on the input data by using 32 filter kernels having a size of 7×7, and the fourth convolution layer 1570 may perform the convolution operation on the input data by using one filter kernel having a size of 5×5.

In FIG. 16, any one or any combination of the first through fourth convolution layers 1510 through 1570, for example, the third convolution layer 1550 may be replaced by a scaler for reducing a size of an input image.

Figure 17:
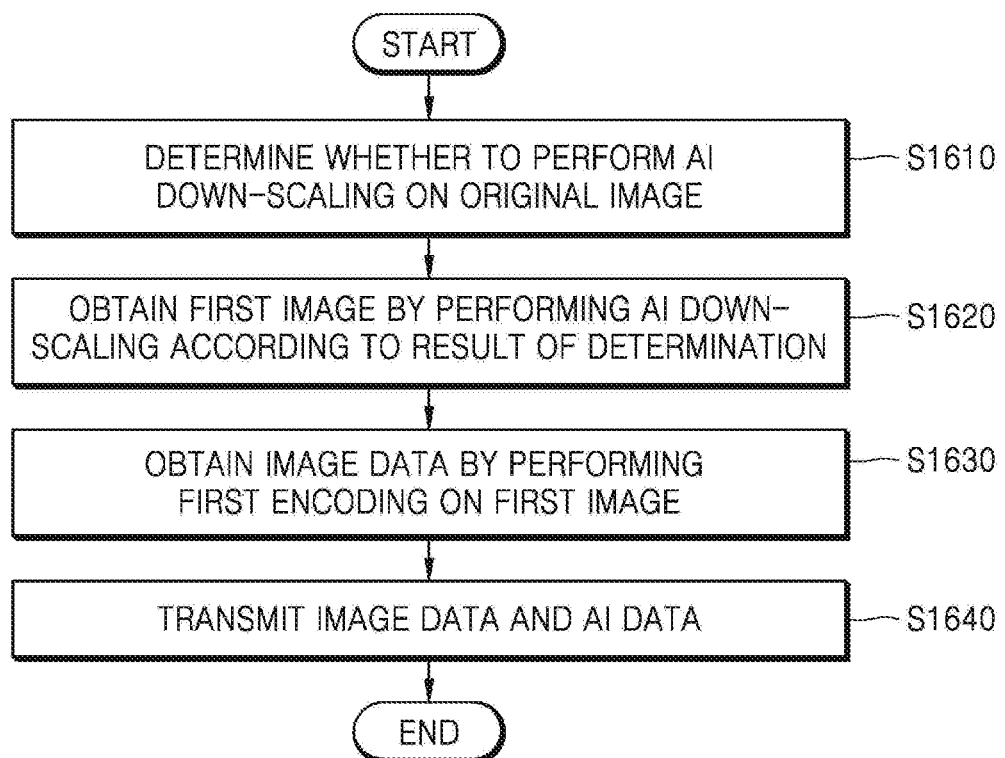
FIG. 17 is a flowchart of an AI encoding method according to embodiments of the disclosure.

FIG. 17 is a flowchart of an AI encoding method according to embodiments of the disclosure.

In operation S1610, the AI encoding apparatus 1200 determines whether to perform AI down-scaling on the original image 105. The AI encoding apparatus 1200 may determine whether to perform the AI down-scaling, based on resolution of the original image 105, a type (for example, a file type) of the original image 105, a type of an object included in the original image 105, and the like. Also, when a first DNN is available, the AI encoding apparatus 1200 may determine to perform AI down-scaling on the original image 105, and when the first DNN is not available, the AI encoding apparatus 1200 may determine not to perform AI down-scaling on the original image 105.

In operation S1620, the AI encoding apparatus 1200 obtains the first image 115 by performing the AI down-scaling on the original image 105 by using the first DNN, based on a result of determining whether to perform the AI down-scaling. When it is determined to perform the AI down-scaling on the original image 105, the AI encoding apparatus 1200 generates the first image 115 by performing the AI down-scaling on the original image 105, and when it is determined not to perform the AI down-scaling on the original image 105, the AI encoding apparatus 1200 does not perform the AI down-scaling on the original image 105.

In operation S1630, the AI encoding apparatus 1200 obtains image data by performing first encoding on the first image 115. The AI encoding apparatus 1200 obtains the image data corresponding to the first image 115 by encoding the first image 115 based on an image compression method using frequency transform. When the AI down-scaling is not performed on the original image 105, the AI encoding apparatus 1200 may obtain the image data by performing the first encoding on the original image 105.

In operation S1640, the AI encoding apparatus 1200 transmits the AI encoding data. The AI encoding data may includes the image data and AI data related to the AI down-scaling. The AI data includes information related to DNN setting information of a second DNN for AI up-scaling.

As described above, because the first DNN and the second DNN are jointly trained, when the AI encoding apparatus 1200 performs AI down-scaling on the original image 105 to a down-scaling target, the AI decoding apparatus 200 performs AI up-scaling on the second image 135 to an up-scaling target corresponding to the down-scaling target. Accordingly, the AI data includes information enabling the AI decoding apparatus 200 to perform AI up-scaling on the second image 135 to the up-scaling target corresponding to the down-scaling target of the original image 105. The AI data includes information used to obtain DNN setting information corresponding to the up-scaling target. Upon receiving the AI data, the AI decoding apparatus 200 is able to infer or verify that DNN setting information is used by the AI encoding apparatus 1200 to perform AI down-scaling on the original image 105, and accordingly, may obtain DNN setting information corresponding to the DNN setting information used to perform AI down-scaling, and perform AI up-scaling by using the obtained DNN setting information.

Also, the AI data includes information indicating whether an image corresponding to the image data is generated through AI down-scaling. When the image data is generated by performing the first encoding on the original image 105 because the AI down-scaling is not performed on the original image 105, the AI data may include information indicating that the image (i.e., the original image 105) corresponding to the image data is not generated through the AI down-scaling. Also, when the image data is generated by performing the first encoding on the first image 115 because the AI down-scaling is performed on the original image 105, the AI data may include information indicating that the image (i.e., the first image 115) corresponding to the image data is generated through the AI down-scaling.

In addition, the AI data may include resolution information of the third image 145 to be generated by the AI decoding apparatus 200, and reference information to be input to the second DNN.

Hereinafter, a method of jointly training a first DNN 1740 and a second DNN 1750 will be described with reference to FIG. 18.

Figure 18:
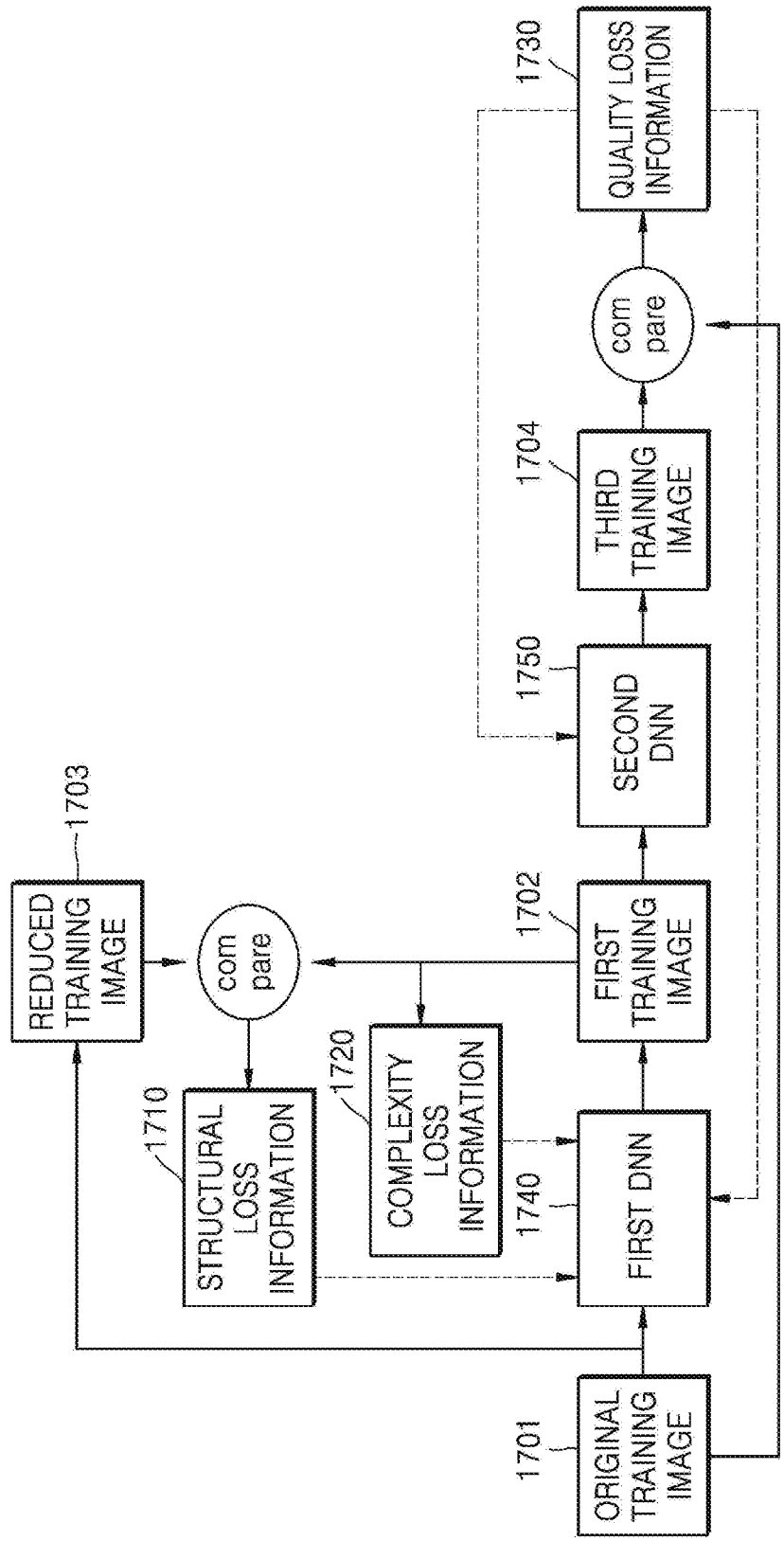
FIG. 18 is a diagram for describing a method of training a first DNN and a second DNN.

FIG. 18 is a diagram for describing a method of training the first DNN 1740 and the second DNN 1750.

In embodiments, the original image 105 on which AI encoding is performed through an AI encoding process is reconstructed to the third image 145 via an AI decoding process, and to maintain similarity between the original image 105 and the third image 145 obtained as a result of AI decoding, connectivity is between the AI encoding process and the AI decoding process. In other words, information lost in the AI encoding process is reconstructed during the AI decoding process, and in this regard, the first DNN 1740 and the second DNN 1750 are jointly trained.

For accurate AI decoding, ultimately, quality loss information 1730 corresponding to a result of comparing a third training image 1704 and an original training image 1701 shown in FIG. 18 may be reduced. Accordingly, the quality loss information 1730 is used to train both of the first DNN 1740 and the second DNN 1750.

First, a training process shown in FIG. 18 will be described.

In FIG. 18, the original training image 1701 is an image on which AI down-scaling is to be performed and a first training image 1702 is an image obtained by performing AI down-scaling on the original training image 1701. Also, the third training image 1704 is an image obtained by performing AI up-scaling on the first training image 1702.

The original training image 1701 includes a still image or a moving image including a plurality of frames. According to embodiments, the original training image 1701 may include a luminance image extracted from the still image or the moving image including the plurality of frames. Also, according to embodiments, the original training image 1701 may include a patch image extracted from the still image or the moving image including the plurality of frames. When the original training image 1701 includes the plurality of frames, the first training image 1702, the second training image, and the third training image 1704 also each include a plurality of frames. When the plurality of frames of the original training image 1701 are sequentially input to the first DNN 1740, the plurality of frames of the first training image 1702, the second training image and the third training image 1704 may be sequentially obtained through the first DNN 1740 and the second DNN 1750.

For joint training of the first DNN 1740 and the second DNN 1750, the original training image 1701 is input to the first DNN 1740. The original training image 1701 input to the first DNN 1740 is output as the first training image 1702 via the AI down-scaling, and the first training image 1702 is input to the second DNN 1750. The third training image 1704 is output as a result of performing the AI up-scaling on the first training image 1702.

Referring to FIG. 18, the first training image 1702 is input to the second DNN 1750, and according to embodiments, a second training image obtained as first encoding and first decoding are performed on the first training image 1702 may be input to the second DNN 1750. To input the second training image to the second DNN 1750, any one codec among MPEG-2, H.264, MPEG-4, HEVC, VC-1, VP8, VP9, and AV1 may be used. Any one codec among MPEG-2, H.264, MPEG-4, HEVC, VC-1, VP8, VP9, and AV1 may be used to perform first encoding on the first training image 1702 and first decoding on image data corresponding to the first training image 1702.

According to embodiments of the disclosure, reference information may also input when the first training image 1702 or the second training image is input to the second DNN 1750. The reference information may include either one or both of position information of pixels included in the first training image 1702 or the second training image, and encoding parameter information that may be generated when the first encoding is performed on the original training image 1701 or the first training image 1702.

The position information of the pixels included in the first training image 1702 or the second training image may include a position map of the first training image 1702 or the second training image, and each of samples of the position map may have a value corresponding to a position of each of the pixels in the first training image 1702 or the second training image.

Also, the encoding parameter information may include various encoding parameter maps that may be generated during the first encoding of the original training image 1701 or the first training image 1702, such as a motion vector map, an intra mode map, a residual distribution map, a prediction motion vector map, and an SAO parameter map according to data units (a largest coding unit, a coding unit, a prediction unit, a transformation unit, or a pixel unit) of the original training image 1701 or the first training image 1702. Each sample in the encoding parameter map may have a value corresponding to an encoding parameter generated in a data unit to which the each sample belongs.

The second DNN 1750 may optimize parameters based on a relationship according to positions between a reference information map and an input image (the first training image 1702 or the second training image) (for example, a relationship between a sample value at a position of the map and a pixel value at a position of the input image).

Referring to FIG. 18, separate from the first training image 1702 being output through the first DNN 1740, a reduced training image 1703 is obtained by performing legacy down-scaling on the original training image 1701. Here, the legacy down-scaling may include any one or any combination of bilinear scaling, bicubic scaling, lanczos scaling, and stair step scaling.

To prevent a structural feature of the first image 115 from deviating greatly from a structural feature of the original image 105, the reduced training image 1703 is obtained to preserve the structural feature of the original training image 1701.

Before training is performed, the first DNN 1740 and the second DNN 1750 may be set to pre-determined DNN setting information. When the training is performed, structural loss information 1710, complexity loss information 1720, and the quality loss information 1730 may be determined.

The structural loss information 1710 may be determined based on a result of comparing the reduced training image 1703 and the first training image 1702. For example, the structural loss information 1710 may correspond to a difference between structural information of the reduced training image 1703 and structural information of the first training image 1702. Structural information may include various features extractable from an image, such as luminance, contrast, histogram, or the like of the image. The structural loss information 1710 indicates how much structural information of the original training image 1701 is maintained in the first training image 1702. When the structural loss information 1710 is small, the structural information of the first training image 1702 is similar to the structural information of the original training image 1701.

The complexity loss information 1720 may be determined based on spatial complexity of the first training image 1702. For example, a total variance value of the first training image 1702 may be used as the spatial complexity. The complexity loss information 1720 is related to a bitrate of image data obtained by performing first encoding on the first training image 1702. It is defined that the bitrate of the image data is low when the complexity loss information 1720 is small.

The quality loss information 1730 may be determined based on a result of comparing the original training image 1701 and the third training image 1704. The quality loss information 1730 may include any one or any combination of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, and a Video Multimethod Assessment Fusion (VMAF) value regarding the difference between the original training image 1701 and the third training image 1704. The quality loss information 1730 indicates how similar the third training image 1704 is to the original training image 1701. The third training image 1704 is more similar to the original training image 1701 when the quality loss information 1730 is small.

Referring to FIG. 18, the structural loss information 1710, the complexity loss information 1720 and the quality loss information 1730 are used to train the first DNN 1740, and the quality loss information 1730 is used to train the second DNN 1750. In other words, the quality loss information 1730 is used to train both the first and second DNNs 1740 and 1750.

The first DNN 1740 may update a parameter such that final loss information determined based on the loss information 1710 through 1730 is reduced or minimized. Also, the second DNN 1750 may update a parameter such that the quality loss information 1730 is reduced or minimized.

The final loss information for training the first DNN 1740 and the second DNN 1750 may be determined as Equation 1 below.

LossDS=a×Structural loss information+b×Complexity loss information+c×Quality loss information [Equation 1]

LossUS=d×Quality loss information

In Equation 1, LossDS indicates final loss information to be reduced or minimized to train the first DNN 1740, and LossUS indicates final loss information to be reduced or minimized to train the second DNN 1750. Also, a, b, c and d may be predetermined weights.

In other words, the first DNN 1740 updates parameters in a direction LossDS of Equation 1 is reduced, and the second DNN 1750 updates parameters in a direction LossUS is reduced. When the parameters of the first DNN 1740 are updated according to LossDS derived during the training, the first training image 1702 obtained based on the updated parameters becomes different from a previous first training image 1702 obtained based on not updated parameters, and accordingly, the third training image 1704 also becomes different from a previous third training image 1704. When the third training image 1704 becomes different from the previous third training image 1704, the quality loss information 1730 is also newly determined, and the second DNN 1750 updates the parameters accordingly. When the quality loss information 1730 is newly determined, LossDS is also newly determined, and the first DNN 1740 updates the parameters according to newly determined LossDS. In other words, updating of the parameters of the first DNN 1740 leads to updating of the parameters of the second DNN 1750, and updating of the parameters of the second DNN 1750 leads to updating of the parameters of the first DNN 1740. In other words, because the first DNN 1740 and the second DNN 1750 are jointly trained by sharing the quality loss information 1730, the parameters of the first DNN 1740 and the parameters of the second DNN 1750 may be jointly optimized.

Referring to Equation 1, it is verified that LossUS is determined according to the quality loss information 1730, but this is only an example and LossUS may be determined based on either one or both of the structural loss information 1710 and the complexity loss information 1720, and the quality loss information 1730.

Hereinabove, it has been described that the AI up-scaler 234 of the AI decoding apparatus 200 and the AI down-scaler 1212 of the AI encoding apparatus 1200 store the plurality of pieces of DNN setting information, and methods of training each of the plurality of pieces of DNN setting information stored in the AI up-scaler 234 and the AI down-scaler 1212 will now be described.

As described with reference to Equation 1, the first DNN 1740 updates the parameters considering the similarity (the structural loss information 1710) between the structural information of the first training image 1702 and the structural information of the original training image 1701, the bitrate (the complexity loss information 1720) of the image data obtained as a result of performing first encoding on the first training image 1702, and the difference (the quality loss information 1730) between the third training image 1704 and the original training image 1701.

The parameters of the first DNN 1740 may be updated such that the first training image 1702 having similar structural information as the original training image 1701 is obtained and the image data having a small bitrate is obtained when first encoding is performed on the first training image 1702, and at the same time, the second DNN 1750 performing AI up-scaling on the first training image 1702 obtains the third training image 1704 similar to the original training image 1701.

A direction in which the parameters of the first DNN 1740 are optimized may vary by adjusting the weights a, b, and c of Equation 1. For example, when the weight b is determined to be high, the parameters of the first DNN 1740 may be updated by prioritizing a low bitrate over high quality of the third training image 1704. Also, when the weight c is determined to be high, the parameters of the first DNN 1740 may be updated by prioritizing high quality of the third training image 1704 over a high bitrate or maintaining of the structural information of the original training image 1701.

Also, the direction in which the parameters of the first DNN 1740 are optimized may vary according to a type of codec used to perform first encoding on the first training image 1702. This is because the second training image to be input to the second DNN 1750 may vary according to the type of codec.

In other words, the parameters of the first DNN 1740 and the parameters of the second DNN 1750 may be jointly updated based on the weights a, b, and c, and the type of codec for performing first encoding on the first training image 1702. Accordingly, when the first DNN 1740 and the second DNN 1750 are trained after determining the weights a, b, and c each to a value and determining the type of codec to a type, the parameters of the first DNN 1740 and the parameters of the second DNN 1750 connected and optimized to each other may be determined.

Also, when the first DNN 1740 and the second DNN 1750 are trained after changing the weights a, b, and c, and the type of codec, the parameters of the first DNN 1740 and the parameters of the second DNN 1750 connected and optimized to each other may be determined. In other words, the plurality of pieces of DNN setting information jointly trained with each other may be determined in the first DNN 1740 and the second DNN 1750 when the first DNN 1740 and the second DNN 1750 are trained while changing values of the weights a, b, and c, and the type of codec.

As described above with reference to FIG. 5, the plurality of pieces of DNN setting information of the first DNN 1740 and the second DNN 1750 may be mapped to the information related to the first image. To set such a mapping relationship, first encoding may be performed on the first training image 1702 output from the first DNN 1740 via a codec according to a bitrate and the second training image obtained by performing first decoding on a bitstream obtained as a result of performing the first encoding may be input to the second DNN 1750. In other words, by training the first DNN 1740 and the second DNN 1750 after setting an environment such that the first encoding is performed on the first training image 1702 of a resolution via the codec according to the bitrate, a DNN setting information pair mapped to the resolution of the first training image 1702, a type of the codec used to perform the first encoding on the first training image 1702, and the bitrate of the bitstream obtained as a result of performing the first encoding on the first training image 1702 may be determined. By variously changing the resolution of the first training image 1702, the type of codec used to perform the first encoding on the first training image 1702 and the bitrate of the bitstream obtained according to the first encoding of the first training image 1702, the mapping relationships between the plurality of DNN setting information of the first DNN 1740 and the second DNN 1750 and the pieces of information related to the first image may be determined.

Figure 19:
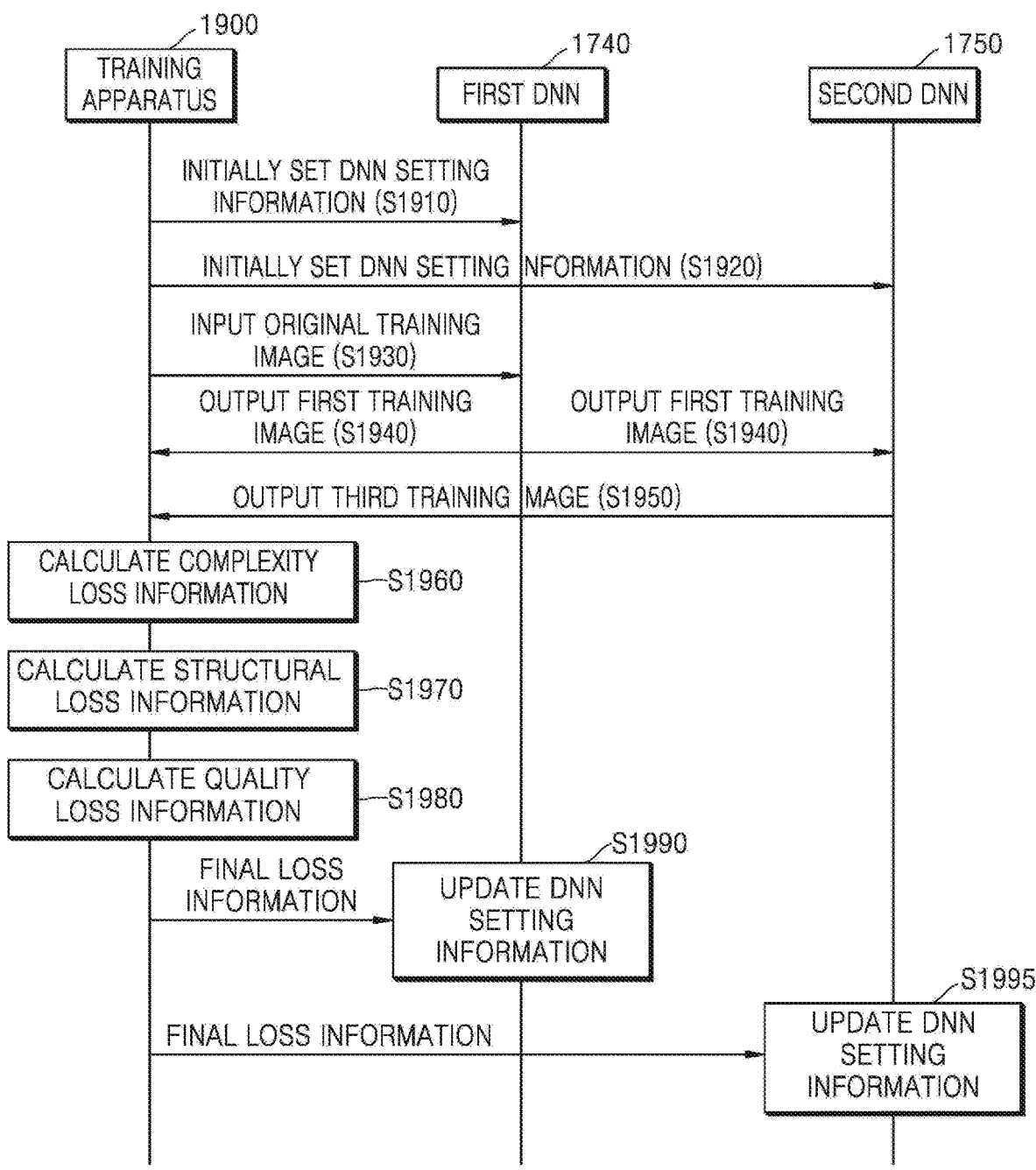
FIG. 19 is a diagram for describing a training process of a first DNN and a second DNN by a training apparatus.

FIG. 19 is a diagram for describing training processes of the first DNN 1740 and the second DNN 1750 by a training apparatus 1900.

The training of the first DNN 1740 and the second DNN 1750 described with reference FIG. 18 may be performed by the training apparatus 1900. The training apparatus 1900 includes the first DNN 1740 and the second DNN 1750. The training apparatus 1900 may be, for example, the AI encoding apparatus 1200 or a separate server. The DNN setting information of the second DNN 1750 obtained as the training result is stored in the AI decoding apparatus 200.

Referring to FIG. 19, the training apparatus 1900 initially sets the DNN setting information of the first DNN 1740 and the second DNN 1750, in operations S1910 and S1920. Accordingly, the first DNN 1740 and the second DNN 1750 may operate according to pre-determined DNN setting information. The DNN setting information may include information about any one or any combination of the number of convolution layers included in the first DNN 1740 and the second DNN 1750, the number of filter kernels for each convolution layer, the size of a filter kernel for each convolution layer, and a parameter of each filter kernel.

The training apparatus 1900 inputs the original training image 1701 into the first DNN 1740, in operation S1930. The original training image 1701 may include a still image or at least one frame included in a moving image.

The first DNN 1740 processes the original training image 1701 according to the initially set DNN setting information and outputs the first training image 1702 obtained by performing AI down-scaling on the original training image 1701, in operation S1940. In FIG. 19, the first training image 1702 output from the first DNN 1740 is directly input to the second DNN 1750, but the first training image 1702 output from the first DNN 1740 may be input to the second DNN 1750 by the training apparatus 1900. Also, the training apparatus 1900 may perform first encoding and first decoding on the first training image 1702 via a codec, and then input the second training image to the second DNN 1750.

The second DNN 1750 processes the first training image 1702 or the second training image according to the initially set DNN setting information and outputs the third training image 1704 obtained by performing AI up-scaling on the first training image 1702 or the second training image, in operation S1950.

The training apparatus 1900 calculates the complexity loss information 1720, based on the first training image 1702, in operation S1960.

The training apparatus 1900 calculates the structural loss information 1710 by comparing the reduced training image 1703 and the first training image 1702, in operation S1970.

The training apparatus 1900 calculates the quality loss information 1730 by comparing the original training image 1701 and the third training image 1704, in operation S1980.

The initially set DNN setting information is updated in operation S1990 via a back propagation process based on the final loss information. The training apparatus 1900 may calculate the final loss information for training the first DNN 1740, based on the complexity loss information 1720, the structural loss information 1710, and the quality loss information 1730.

The second DNN 1750 updates the initially set DNN setting information in operation S1995 via a back propagation process based on the quality loss information 1730 or the final loss information. The training apparatus 1900 may calculate the final loss information for training the second DNN 1750, based on the quality loss information 1730.

Then, the training apparatus 1900, the first DNN 1740, and the second DNN 1750 may repeat operations S1930 through S1995 until the final loss information is minimized to update the DNN setting information. At this time, during each repetition, the first DNN 1740 and the second DNN 1750 operate according to the DNN setting information updated in the previous operation.

Table 1 below shows effects when AI encoding and AI decoding are performed on the original image 105 according to embodiments of the disclosure and when encoding and decoding are performed on the original image 105 via HEVC.

TABLE 1

| Content | Resolution | Frame Number | Information Amount (Bitrate) (Mbps) | | Subjective Image Quality Score (VMAF) | |
| --- | --- | --- | --- | --- | --- | --- |
| | | | HEVC | AI Encoding/ AI Decoding | HEVC | AI Encoding/ AI Decoding |
| Content_01 | 8K | 300 frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, despite subjective image quality when AI encoding and AI decoding are performed on content including 1750 frames of 8 K resolution, according to embodiments of the disclosure, is higher than subjective image quality when encoding and decoding are performed via HEVC, a bitrate is reduced by at least 50%.

Figure 20:
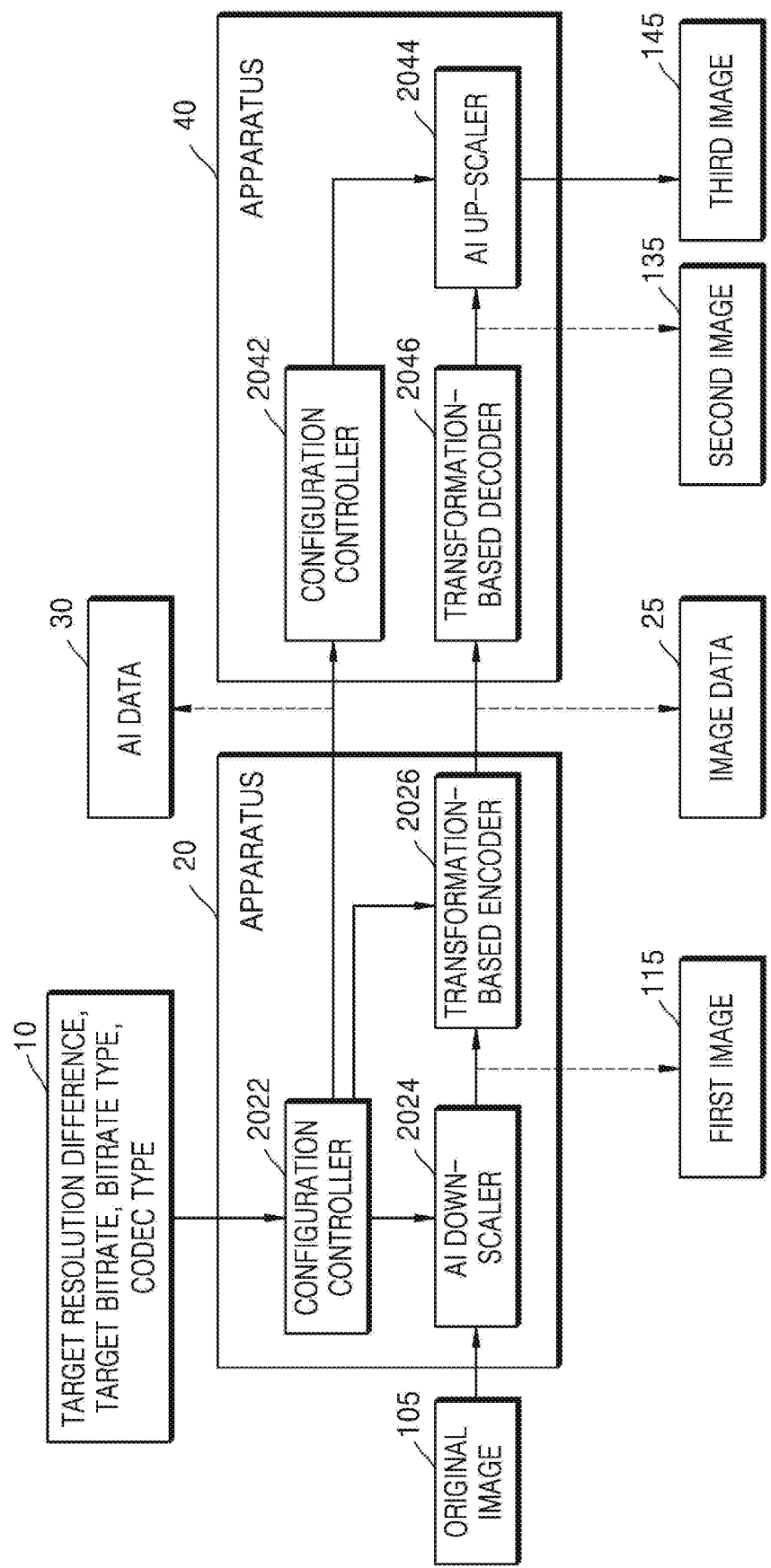
FIG. 20 is a diagram of an apparatus for performing AI down-scaling on an original image and an apparatus for performing AI up-scaling on a second image.

FIG. 20 is a diagram of an apparatus 20 for performing AI down-scaling on the original image 105 and an apparatus 40 for performing AI up-scaling on the second image 135.

The apparatus 20 receives the original image 105 and provides image data 25 and AI data 30 to the apparatus 40 by using an AI down-scaler 2024 and a transformation-based encoder 2026. According to embodiments, the image data 25 corresponds to the image data of FIG. 1A and the AI data 30 corresponds to the AI data of FIG. 1A. Also, according to embodiments, the transformation-based encoder 2026 corresponds to the first encoder 1214 of FIG. 13 and the AI down-scaler 2024 corresponds to the AI down-scaler 1212 of FIG. 13.

The apparatus 40 receives the AI data 30 and the image data 25 and obtains the third image 145 by using a transformation-based decoder 2046 and an AI up-scaler 2044. According to embodiments, the transformation-based decoder 2046 corresponds to the first decoder 232 of FIG. 2 and the AI up-scaler 2044 corresponds to the AI up-scaler 234 of FIG. 2.

According to embodiments, the apparatus 20 includes a CPU, a memory, and a computer program including instructions. The computer program is stored in the memory. According to embodiments, the apparatus 20 performs functions to be described with reference to FIG. 20 according to execution of the computer program by the CPU. According to embodiments, the functions to be described with reference to FIG. 20 are performed by a dedicated hardware chip and/or the CPU.

According to embodiments, the apparatus 40 includes a CPU, a memory, and a computer program including instructions. The computer program is stored in the memory. According to embodiments, the apparatus 40 performs functions to be described with reference to FIG. 20 according to execution of the computer program by the CPU. According to embodiments, the functions to be described with reference to FIG. 20 are performed by a dedicated hardware chip and/or the CPU.

In FIG. 20, a configuration controller 2022 receives at least one input value 10. According to embodiments, the at least one input value 10 may include any one or any combination of a target resolution difference for the AI down-scaler 2024 and the AI up-scaler 2044, a bitrate of the image data 25, a bitrate type of the image data 25 (for example, a variable bitrate type, a constant bitrate type, or an average bitrate type), and a codec type for the transformation-based encoder 2026. The at least one input value 10 may include a value pre-stored in the apparatus 20 or a value input from a user.

The configuration controller 2022 controls operations of the AI down-scaler 2024 and the transformation-based encoder 2026, based on the received input value 10. According to embodiments, the configuration controller 2022 obtains DNN setting information for the AI down-scaler 2024 according to the received input value 10, and sets the AI down-scaler 2024 with the obtained DNN setting information. According to embodiments, the configuration controller 2022 may transmit the received input value 10 to the AI down-scaler 2024 and the AI down-scaler 2024 may obtain the DNN setting information for performing AI down-scaling on the original image 105, based on the received input value 10. According to embodiments, the configuration controller 2022 may provide, to the AI down-scaler 2024, additional information, for example, color format (luminance component, chrominance component, red component, green component, or blue component) information to which AI down-scaling is applied and tone mapping information of a high dynamic range (HDR), together with the input value 10, and the AI down-scaler 2024 may obtain the DNN setting information considering the input value 10 and the additional information. According to embodiments, the configuration controller 2022 transmits at least a part of the received input value 10 to the transformation-based encoder 2026 and the transformation-based encoder 2026 performs first encoding on the first image 115 via a bitrate of a value, a bitrate of a type, and a codec.

The AI down-scaler 2024 receives the original image 105 and performs an operation described with reference to any one or any combination of FIGS. 1A, 1B, 13, 14, 15, 16, 17, 18 and 19 to obtain the first image 115.

According to embodiments, the AI data 30 is provided to the apparatus 40. The AI data 30 may include either one or both of resolution difference information between the original image 105 and the first image 115, and information related to the first image 115. The resolution difference information may be determined based on the target resolution difference of the input value 10, and the information related to the first image 115 may be determined based on any one or any combination of a target bitrate, the bitrate type, and the codec type. According to embodiments, the AI data 30 may include parameters used during the AI up-scaling. The AI data 30 may be provided from the AI down-scaler 2024 to the apparatus 40.

The image data 25 is obtained as the original image 105 is processed by the transformation-based encoder 2026, and is transmitted to the apparatus 40. The transformation-based encoder 2026 may process the first image 115 according to MPEG-2, H.264 AVC, MPEG-4, HEVC, VC-1, VP8, VP9, or VA1.

A configuration controller 2042 controls an operation of the AI up-scaler 2044, based on the AI data 30. According to embodiments, the configuration controller 2042 obtains the DNN setting information for the AI up-scaler 2044 according to the received AI data 30, and sets the AI up-scaler 2044 with the obtained DNN setting information. According to embodiments, the configuration controller 2042 may transmit the received AI data 30 to the AI up-scaler 2044 and the AI up-scaler 2044 may obtain the DNN setting information for performing AI up-scaling on the second image 135, based on the AI data 30. According to embodiments, the configuration controller 2042 may provide, to the AI up-scaler 2044, additional information, for example, the color format (luminance component, chrominance component, red component, green component, or blue component) information to which AI up-scaling is applied, and the tone mapping information of HDR, together with the AI data 30, and the AI up-scaler 2044 may obtain the DNN setting information considering the AI data 30 and the additional information. According to embodiments, the AI up-scaler 2044 may receive the AI data 30 from the configuration controller 2042, receive any one or any combination of prediction mode information, motion information, and quantization parameter information from the transformation-based decoder 2046, and obtain the DNN setting information based on the AI data 30 and any one or any combination of the prediction mode information, the motion information, and the quantization parameter information.

The transformation-based decoder 2046 may process the image data 25 to reconstruct the second image 135. The transformation-based decoder 2046 may process the image data 25 according to MPEG-2, H.264 AVC, MPEG-4, HEVC, VC-1, VP8, VP9, or AV1.

The AI up-scaler 2044 may obtain the third image 145 by performing AI up-scaling on the second image 135 provided from the transformation-based decoder 2046, based on the set DNN setting information.

The AI down-scaler 2024 may include a first DNN and the AI up-scaler 2044 may include a second DNN, and according to embodiments, DNN setting information for the first DNN and second DNN are trained according to the training method described with reference to FIGS. 18 and 19.

The embodiments of the disclosure described above may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A model related to the DNN described above may be implemented via a software module. When the DNN model is implemented via a software module (for example, a program module including instructions), the DNN model may be stored in a computer-readable recording medium.

Also, the DNN model may be a part of the AI decoding apparatus 200 or AI encoding apparatus 1200 described above by being integrated in a form of a hardware chip. For example, the DNN model may be manufactured in a form of an dedicated hardware chip for AI, or may be manufactured as a part of an existing general-purpose processor (for example, CPU or application processor) or a graphic-dedicated processor (for example GPU).

Also, the DNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While one or more embodiments of the disclosure have been described with reference to the figures, it will be understood by those of ordinary skill in the art that various changes in form and details may be made therein without departing from the spirit and scope as defined by the following claims.

What is claimed is:

1. An electronic device for displaying an image by using an artificial intelligence (AI), the electronic device comprising:
    a display; and
    one or more processors configured to execute one or more instructions stored in the electronic device, to:
        receive AI data that is related to AI down-scaling an original image to a first image through a down-scaling neural network (NN) based on first NN setting information, the first NN setting information being selected from a plurality of first NN setting information that is pre-stored in a server, the AI data comprising a bitrate of an image data generated through an encoding on the first image;
        receive the image data;
        decode the image data to obtain a second image;
        determine whether to perform AI up-scaling through an up-scaling NN, based on the AI data;
        based on the AI up-scaling being determined to be performed:
        select, based on the AI data, second NN setting information paired with the first NN setting information, from a plurality of second NN setting information that is pre-stored in the electronic device;
        obtain a third image corresponding to the original image by performing the AI up-scaling on the obtained second image through the up-scaling NN set with the selected second NN setting information; and
        provide, on the display of the electronic device, the obtained third image; and
        based on the AI up-scaling of the obtained second image being determined to be not performed:
        output the obtained second image,
    wherein the plurality of first NN setting information pre-stored in the server and the plurality of second NN setting information pre-stored in the electronic device are obtained through joint training of the up-scaling NN and the down-scaling NN.

2. The electronic device of claim 1, wherein the one or more processors are further configured to execute the stored one or more instructions to:
    identify whether the first image is obtained by performing the AI down-scaling of the original image, based on the AI data; and
    based on the first image being identified to be obtained by performing the AI down-scaling of the original image, determine to perform the AI up-scaling of the obtained second image.

3. The electronic device of claim 2, wherein the one or more processors are further configured to execute the stored one or more instructions to:
    identify whether the first image is obtained by performing the AI down-scaling of the original image, based on the AI data, and whether the up-scaling NN is available; and
    based on the first image being identified to be obtained by performing the AI down-scaling of the original image, and based on the up-scaling NN being identified to be available, determine to perform the AI up-scaling of the obtained second image.

4. The electronic device of claim 3, wherein the one or more processors are further configured to execute the stored one or more instructions to:
    identify whether the up-scaling NN is stored in the electronic device, and whether second NN setting information for operating the up-scaling NN is stored in the electronic device; and
    based on the up-scaling NN being identified to be not stored in the electronic device or the second NN setting information being identified to be not stored in the electronic device, identify that the up-scaling NN is not available.

5. The electronic device of claim 3, wherein the one or more processors are further configured to execute the stored one or more instructions to, based on the first image being identified to be obtained by performing the AI down-scaling of the original image, and based on the up-scaling NN being identified to be not available, control the electronic device to output the obtained second image, and
    wherein the output second image is up-scaled by the display.

6. The electronic device of claim 3, wherein the one or more processors are further configured to execute the stored one or more instructions to, based on the first image being identified to be obtained by performing the AI down-scaling of the original image, and based on the up-scaling NN being identified to be not available, determine to perform legacy up-scaling of the obtained second image.

7. The electronic device of claim 1, wherein the AI data comprises at least one of information about a difference between the original image and the first image, a resolution of the first image, a codec type for encoding the first image and the second NN setting information.

8. The electronic device of claim 1, wherein the up-scaling NN is trained based on quality loss information corresponding to a result of comparing a training image that is output from the up-scaling NN and an original training image.

9. The electronic device of claim 1, wherein the one or more processors are further configured to execute the stored one or more instructions to obtain the third image by inputting the obtained second image and information related to the obtained second image to the up-scaling NN, and
wherein the information related to the obtained second image comprises either one or both of position information of pixels of the obtained second image and encoding parameter information.

10. The electronic device of claim 1, wherein the up-scaling NN comprises:
a plurality of convolution layers configured to sequentially perform a plurality of convolution operations on the obtained second image; and
a bypass scaler configured to perform a scaling process on the obtained second image, and
wherein the third image is obtained based on a result of combining an output of the plurality of convolution layers and an output of the bypass scaler.

11. The electronic device of claim 1, wherein the one or more processors further comprise:
a first processor configured to obtain the second image by decoding the image data; and
a second processor configured to obtain the third image by performing the AI up-scaling,
wherein the second processor is configured to, based on the AI up-scaling of the obtained second image being determined to be performed:
control a first switch so that the second processor obtains, from the first processor, the obtained second image; and
control a second switch so that the electronic device outputs the obtained third image.

12. The electronic device of claim 11, wherein the second processor is further configured to, based on the AI up-scaling of the obtained second image being determined to be not performed:
control the first switch so that the second processor is prevented from obtaining, from the first processor, the obtained second image; and
control the second switch so that the electronic device outputs the obtained second image.

13. The electronic device of claim 1, wherein the AI data comprises the information related to the first image,
wherein the one or more processors are further configured to obtain the second NN setting information mapped to the information related to the first image, based on a mapping relationship between a plurality of image-related information and the plurality of second NN setting information, and
wherein the information related to the first image comprises information related to at least one of a resolution and a codec type.

14. The electronic device of claim 1, wherein the one or more processors are further configured to execute the one or more instructions to:
identify whether the AI data comprises a first flag indicating that the first image is generated through the down-scaling NN or a second flag indicating that the first image is not generated through the down-scaling NN;
determine to perform the AI up-scaling on the obtained second image based on the first flag being included in the AI data; and
determine to not perform the AI up-scaling on the obtained second image based on the second flag being included in the AI data.

15. A method performed by an electronic device for displaying an image by using an artificial intelligence (AI), the method comprising:
receiving image data generated through an encoding on a first image;
receiving AI data that comprises a bitrate of the image data and is related to AI down-scaling an original image through a down-scaling neural network (NN) based on first NN setting information selected from a plurality of first NN setting information that is pre-stored in a server;
decoding the image data to obtain a second image corresponding to the first image;
determining whether to perform AI up-scaling based on the AI data;
based on the AI up-scaling being determined to be performed:
selecting, based on the AI data, second NN setting information that is paired with the first NN setting information, from a plurality of second NN setting information that is pre-stored in the electronic device;
obtaining a third image corresponding to the original image by performing the AI up-scaling on the obtained second image through an up-scaling NN set with the selected second NN setting information; and
providing, on a display of the electronic device, the obtained third image; and
based on the AI up-scaling being determined to be not performed:
outputting the obtained second image,
wherein the plurality of first NN setting information pre-stored in the server and the plurality of second NN setting information pre-stored in the electronic device are obtained through joint training of the up-scaling NN and the down-scaling NN.

16. A non-transitory computer-readable recording medium having recorded thereon a program that, when executed by a computer, performs the method of claim 15.

* * * * *